United States Patent
Hamad et al.

(10) Patent No.: US 9,957,903 B2
(45) Date of Patent: May 1, 2018

(54) ADJUSTING A FUEL ON-BOARD A VEHICLE

(71) Applicant: Saudi Arabian Oil Company, Dhahran (SA)

(72) Inventors: Esam Z. Hamad, Dhahran (SA); Ibrahim M. Algunaibet, AlKhobar (SA)

(73) Assignee: Saudi Arabian Oil Company, Dhahran (SA)

(*) Notice: Subject to any disclaimer, the term of this patent is extended or adjusted under 35 U.S.C. 154(b) by 199 days.

(21) Appl. No.: 15/044,589

(22) Filed: Feb. 16, 2016

(65) Prior Publication Data

US 2017/0234244 A1 Aug. 17, 2017

(51) Int. Cl.
*F02D 19/06* (2006.01)
*B01D 3/06* (2006.01)
(Continued)

(52) U.S. Cl.
CPC ........... *F02D 19/0649* (2013.01); *B01D 3/06* (2013.01); *B01D 3/42* (2013.01); *F02B 61/00* (2013.01);
(Continued)

(58) Field of Classification Search
CPC ............. F02D 19/0649; F02D 19/0615; F02D 19/0671; F02M 37/0064; F02M 37/223;
(Continued)

(56) References Cited

U.S. PATENT DOCUMENTS 3,985,108 A 10/1976 Matsumoto et al.
5,357,908 A 10/1994 Sung et al.
(Continued)

FOREIGN PATENT DOCUMENTS

EP 1443202 8/2004
EP 1057988 1/2006
(Continued)

OTHER PUBLICATIONS

Invitation to Pay Additional Fees and Partial International Search Report issued in International Application No. PCT/US2017/013706 dated May 11, 2017; 14 pages.
(Continued)

*Primary Examiner* — Jacob Amick
(74) *Attorney, Agent, or Firm* — Fish & Richardson P.C.

(57) ABSTRACT

A fuel separation system includes a fuel separator configured to receive a fuel stream and separate the fuel stream, based on a volatility of the fuel stream, into a vapor stream defined by a first auto-ignition characteristic value and a first liquid stream defined by a second auto-ignition characteristic value, the second auto-ignition characteristic value greater than the first auto-ignition characteristic value; and a control system communicably coupled to the fuel separator and operable to receive an input from an engine, the input including an engine operating condition, the control system configured to adjust an operating parameter of the fuel separator, based at least in part on the engine operating condition, to vary at least one of the first or second auto-ignition characteristic values.

30 Claims, 9 Drawing Sheets

(51) Int. Cl.

| | | |
|---|---|---|
| *B01D 3/42* | (2006.01) | |
| *F02B 61/00* | (2006.01) | |
| *F02B 63/04* | (2006.01) | |
| *F02M 33/08* | (2006.01) | |
| *F02M 37/00* | (2006.01) | |
| *F02M 37/20* | (2006.01) | |
| *F02M 37/22* | (2006.01) | |
| *F02M 31/18* | (2006.01) | |
| *F02D 29/06* | (2006.01) | |

(52) U.S. Cl.
CPC .......... *F02B 63/04* (2013.01); *F02D 19/0615* (2013.01); *F02D 19/0671* (2013.01); *F02M 31/18* (2013.01); *F02M 33/08* (2013.01); *F02M 37/0064* (2013.01); *F02M 37/0088* (2013.01); *F02M 37/20* (2013.01); *F02M 37/223* (2013.01); *F02D 19/0665* (2013.01); *F02D 19/0692* (2013.01); *F02D 29/06* (2013.01); *F02D 2200/0611* (2013.01); *F02D 2200/101* (2013.01); *F02D 2200/1002* (2013.01)

(58) Field of Classification Search
CPC .... F02M 37/0088; F02M 33/08; F02M 31/18; B01D 3/06; B01D 3/42
See application file for complete search history.

(56) References Cited

U.S. PATENT DOCUMENTS

| | | | |
|---|---|---|---|
| 5,794,601 | A | 8/1998 | Pantone |
| 6,119,637 | A | 9/2000 | Matthews et al. |
| 6,494,192 | B1 | 12/2002 | Capshaw et al. |
| 7,370,610 | B2 | 5/2008 | Ashford et al. |
| 8,051,828 | B2 | 11/2011 | Sengupta et al. |
| 8,580,111 | B2 | 11/2013 | Partridge |
| 9,080,501 | B2 | 7/2015 | Reitz |
| 9,664,147 | B2 | 5/2017 | Leone |
| 2002/0139111 | A1 | 10/2002 | Ueda et al. |
| 2004/0149644 | A1* | 8/2004 | Partridge ............... C10G 31/11 210/321.6 |
| 2005/0262842 | A1* | 12/2005 | Claassen ............... F01K 23/065 60/618 |
| 2005/0267224 | A1 | 12/2005 | Herling et al. |
| 2006/0037589 | A1 | 2/2006 | Gupta |
| 2006/0118085 | A1 | 6/2006 | Oda |
| 2007/0101716 | A1 | 5/2007 | Tafas |
| 2009/0242038 | A1* | 10/2009 | Sengupta ............ F02D 41/0025 137/93 |
| 2010/0155315 | A1 | 6/2010 | Partridge |
| 2010/0155322 | A1 | 6/2010 | Partridge |
| 2012/0132576 | A1 | 5/2012 | Partridge |
| 2012/0132577 | A1 | 5/2012 | Partridge |
| 2013/0228495 | A1 | 9/2013 | Shafi et al. |
| 2013/0333644 | A1 | 12/2013 | Shigetoyo |
| 2014/0034021 | A1 | 2/2014 | Pursifull et al. |
| 2017/0058791 | A1 | 3/2017 | Ishimitsu |
| 2017/0122275 | A1 | 5/2017 | Ishimitsu |

FOREIGN PATENT DOCUMENTS

| | | |
|---|---|---|
| EP | 1983178 | 10/2008 |
| JP | 2010-013948 | 1/2010 |
| WO | WO03106596 | 12/2003 |
| WO | WO2007033460 | 3/2007 |
| WO | WO2009085260 | 7/2009 |
| WO | WO2011014226 | 2/2011 |
| WO | 2015155813 | 10/2015 |

OTHER PUBLICATIONS

International Search Report and Written Opinion issued in International Application No. PCT/US2017/013706 dated Jul. 7, 2017; 18 pages.

Gupta et al. "Heat Pipe for Heating of Gasoline for On-Board Octane Segregation." U.S. Appl. No. 11/187,672, dated Jul. 22, 2005, 15 pages.

International Search Report and Written Opinion issued in International Application No. PCT/US2017/013707 dated Apr. 3, 2017.

\* cited by examiner

ADJUSTING A FUEL ON-BOARD A VEHICLE

TECHNICAL FIELD

This disclosure relates to adjusting a fuel on-board a vehicle and, more particularly, dynamically separating a fuel on-board a vehicle according to at least one characteristic of the fuel.

BACKGROUND

Vehicles, such as cars, trucks, boats, all-terrain vehicles, and otherwise, typical use internal combustion engines for power. These engines require fuel, such as gasoline, diesel, or otherwise, to operate. The fuel is often characterized by an octane or cetane number.

SUMMARY

In a general implementation, a fuel separation system includes a fuel separator configured to receive a fuel stream and separate the fuel stream, based on a volatility of the fuel stream, into a vapor stream defined by a first auto-ignition characteristic value and a first liquid stream defined by a second auto-ignition characteristic value, the second auto-ignition characteristic value greater than the first auto-ignition characteristic value; and a control system communicably coupled to the fuel separator and operable to receive an input from an engine, the input including an engine operating condition, the control system configured to adjust an operating parameter of the fuel separator, based at least in part on the engine operating condition, to vary at least one of the first or second auto-ignition characteristic values.

In an aspect combinable with the general implementation, the engine operating condition includes an engine load, an engine torque, and engine speed, a fuel vapor-liquid ratio, a fuel vapor lock index, a fuel drivability index, a fuel T90 or T95 property, a fuel lubricity, a fuel viscosity, or an engine speed-torque ratio.

In another aspect combinable with any of the previous aspects, the operating parameter of the fuel separator includes at least one of an operating pressure, an operating temperature, a flow rate of the fuel stream, a flow rate of the vapor stream, a flow rate of the first liquid stream, or a flow rate of the second liquid stream.

Another aspect combinable with any of the previous aspects further includes a heat exchanger fluidly coupled between a fuel input of the fuel stream and the fuel separator, the heat exchanger configured to transfer heat from the vapor stream to the fuel stream, and output a heated fuel stream to the fuel separator and a second liquid stream defined by the first auto-ignition characteristic value.

In another aspect combinable with any of the previous aspects, the heat exchanger is configured to condense the vapor stream to the second liquid stream defined by the first auto-ignition characteristic value.

Another aspect combinable with any of the previous aspects further includes a heater coupled between the heat exchanger and the fuel separator and configured to receive the heated fuel stream and further heat the heated fuel stream.

Another aspect combinable with any of the previous aspects further includes a variable orifice fluidly coupled between the heat exchanger and the fuel separator.

In another aspect combinable with any of the previous aspects, the control system is operatively coupled to control at least one of the heat exchanger, the heater, or the variable orifice to vary at least one of a temperature or a flow rate of at least one of the heated fuel stream, the vapor stream, the first liquid stream, or the second liquid stream.

In another aspect combinable with any of the previous aspects, the fuel separator includes a flash distillation separator.

In another aspect combinable with any of the previous aspects, the fuel separator includes a first stage fuel separator and a second stage fuel separator.

In another aspect combinable with any of the previous aspects, the first stage fuel separator is configured to receive the fuel stream and separate the fuel stream, based on the volatility of the fuel stream, into the vapor stream defined by the first auto-ignition characteristic value and the first liquid stream defined by the second auto-ignition characteristic value.

In another aspect combinable with any of the previous aspects, the second stage fuel separator is configured to separate the vapor stream into an oxygenate stream and a compound stream.

In another aspect combinable with any of the previous aspects, the second stage fuel separator is configured to direct the oxygenate stream to combine with the first liquid stream, and to direct the compound stream to the heat exchanger.

In another aspect combinable with any of the previous aspects, the first auto-ignition characteristic value includes a first research octane number (RON) or a first cetane number, and the second auto-ignition characteristic value includes a second RON or a second cetane number.

In another general implementation, a method for separating a fuel on-board a vehicle includes receiving, at a control system of an on-board fuel separation system of a vehicle that includes an engine, an engine operating condition; operating the fuel separator of the on-board fuel separator at an operating parameter to separate a fuel stream into a vapor stream and a first liquid stream based on a volatility of the fuel stream, the vapor stream defined by a first auto-ignition characteristic value and the first liquid stream defined by a second auto-ignition characteristic value, the second auto-ignition characteristic value greater than the first auto-ignition characteristic value; adjusting, based at least in part on the engine operating condition, the operating parameter of the fuel separator to vary at least one of the first or second auto-ignition characteristic values; and operating the fuel separator of the on-board fuel separator at the adjusted operating parameter.

In an aspect combinable with the general implementation, the engine operating condition includes an engine load, an engine torque, and engine speed, a fuel vapor-liquid ratio, a fuel vapor lock index, a fuel drivability index, a fuel T90 or T95 property, a fuel lubricity, a fuel viscosity, or an engine speed-torque ratio.

In another aspect combinable with any of the previous aspects, the operating parameter of the fuel separator includes at least one of an operating pressure, an operating temperature, a flow rate of the fuel stream, a flow rate of the vapor stream, a flow rate of the first liquid stream, or a flow rate of the second liquid stream.

Another aspect combinable with any of the previous aspects further includes supplying an unheated fuel stream and the vapor stream from the fuel separator to a heat exchanger; transferring heat from the vapor stream to the unheated fuel stream to heat the unheated fuel stream; supplying the heated fuel stream to the fuel separator; and supplying a second liquid stream defined by the first auto-ignition characteristic value from the heat exchanger.

Another aspect combinable with any of the previous aspects further includes condensing, with the heat exchanger, the vapor stream to form the second liquid stream.

Another aspect combinable with any of the previous aspects further includes further heating the heated fuel stream; and supplying the further heated fuel stream to the fuel separator.

Another aspect combinable with any of the previous aspects further includes circulating the heated fuel stream through a variable orifice fluidly coupled between the heat exchanger and the fuel separator.

Another aspect combinable with any of the previous aspects further includes controlling, with the control system, at least one of the heat exchanger, the heater, or the variable orifice to vary at least one of a temperature or a flow rate of at least one of the heated fuel stream, the vapor stream, the first liquid stream, or the second liquid stream.

In another aspect combinable with any of the previous aspects, the fuel separator includes a first stage fuel separator and a second stage fuel separator.

Another aspect combinable with any of the previous aspects further includes separating, with the first stage fuel separator, the heated fuel stream into the vapor stream defined by the first auto-ignition characteristic value and the first liquid stream defined by the second auto-ignition characteristic value, based on the volatility of the fuel stream, and separating, with the second stage fuel separator, the vapor stream into an oxygenate stream and a compound stream.

Another aspect combinable with any of the previous aspects further includes combining the oxygenate stream with the first liquid stream; and supplying the compound stream to the heat exchanger.

In another aspect combinable with any of the previous aspects, the first auto-ignition characteristic value includes a first research octane number (RON) or a first cetane number, and the second auto-ignition characteristic value includes a second RON or a second cetane number.

In another general implementation, a vehicle system includes a vehicle; a fuel-powered internal combustion engine mounted in the vehicle; an on-board fuel separation system, that includes a fuel separator configured to receive a fuel stream and separate the fuel stream, based on a volatility of the fuel stream, into a vapor stream defined by a first auto-ignition characteristic value and a first liquid stream defined by a second auto-ignition characteristic value, the second auto-ignition characteristic value greater than the first auto-ignition characteristic value, and a control system communicably coupled to the fuel separator and operable to receive an input from the engine, the input including an engine operating condition, the control system configured to adjust an operating parameter of the fuel separator, based at least in part on the engine operating condition, to vary at least one of the first or second auto-ignition characteristic values; a first fuel tank fluidly coupled between the engine and the fuel separator to store the first liquid stream output from the fuel separator; and a second fuel tank fluidly coupled between the engine and the heat exchanger to store the second liquid stream output from the heat exchanger.

In an aspect combinable with the general implementation, the engine operating condition includes an engine load, an engine torque, and engine speed, a fuel vapor-liquid ratio, a fuel vapor lock index, a fuel drivability index, a fuel T90 or T95 property, a fuel lubricity, a fuel viscosity, or an engine speed-torque ratio.

In another aspect combinable with any of the previous aspects, the operating parameter of the fuel separator includes at least one of an operating pressure, an operating temperature, a flow rate of the fuel stream, a flow rate of the vapor stream, a flow rate of the first liquid stream, or a flow rate of the second liquid stream.

Another aspect combinable with any of the previous aspects further includes a heat exchanger fluidly coupled between a fuel input of the fuel stream and the fuel separator, the heat exchanger configured to transfer heat from the vapor stream to the fuel stream, and output a heated fuel stream to the fuel separator and a second liquid stream defined by the first auto-ignition characteristic value.

In another aspect combinable with any of the previous aspects, the heat exchanger is configured to condense the vapor stream to the second liquid stream defined by the first auto-ignition characteristic value.

Another aspect combinable with any of the previous aspects further includes a heater coupled between the heat exchanger and the fuel separator and configured to receive the heated fuel stream and further heat the heated fuel stream; and a variable orifice fluidly coupled between the heat exchanger and the fuel separator.

In another aspect combinable with any of the previous aspects, the control system is operatively coupled to control at least one of the heat exchanger, the heater, or the variable orifice to vary at least one of a temperature or a flow rate of at least one of the heated fuel stream, the vapor stream, the first liquid stream, or the second liquid stream.

In another aspect combinable with any of the previous aspects, the first auto-ignition characteristic value includes a first research octane number (RON) or a first cetane number, and the second auto-ignition characteristic value includes a second RON or a second cetane number.

Another aspect combinable with any of the previous aspects further includes a turbine that includes an input fluidly coupled to the fuel separator and output fluidly coupled to the heat exchanger and configured to receive the vapor stream from the fuel separator and generate electrical power based on a pressure difference of the vapor stream between the input and the output.

Other aspects include: electrical power generated by a turbine can be stored and then utilized to heat the separation system at engine start up, or used in running auxiliary units or hybrid systems; two tanks to store two separated streams could be eliminated by dynamic control (of temperature for example) to get the appropriate volumetric flow rate and octane number of each of the two separated streams; minimization of heat exchanger size (or reboiler in case of distillation unit) can be accomplished by keeping a liquid under a particular pressure (about 10 bar) to prevent phase change within the heat exchanger; vaporization may take place once a liquid passes a control valve (for example, an orifice) and enters the flash or distillation unit at the operating pressure; for better condensation of the vapor phase, the flash tank or distillation column could be operated at a pressure above the atmospheric pressure, which may lead to full condensation with less cooling (at higher temperatures), provided that the vapor stream remains under pressure until condensed or injected in the engine; and solar panels could be fitted to the vehicle and the electrical power generated used to run the components that needs electricity, such as pumps, any valves or control systems, and otherwise.

Implementations according to the present disclosure may include one or more of the following features. For example, implementations can reduce fuel consumption, fuel cost, as well as $CO_2$ emissions from vehicles. As another example, fuel consumption of a vehicle may be reduced by supplying the engine of the vehicle with a fuel that has an optimized auto-ignition characteristic value (for example, octane, cetane, or otherwise), rather than a higher volumetric flow rate of fuel. For instance, implementations may supply the engine with a fuel of a particular optimized auto-ignition characteristic value based on engine load or operating conditions. Such implementations may optimize the auto-ignition characteristic value of a single source of fuel stored on the vehicle (for example, in a fuel tank). Implementations described herein may also provide an additional energy source to power components of the vehicle by optimizing the auto-ignition characteristic value of fuel. Additionally, implementations described herein may optimize the auto-ignition characteristic value of fuel on-board the vehicle. As another example, implementations disclosed herein may provide for multiple fuel streams, each with different auto-ignition characteristic values, from a single fuel source stored on an operating vehicle. As yet another example, implementations may allow a vehicle driver to purchase a fuel with a low auto-ignition characteristic value (for example, low octane number), which is typically more cost-efficient, while still allowing the vehicle to use both the purchased fuel and a separated, higher value, fuel. As a further example, implementation may provide an additional source of electrical power (for example, in addition to conventional sources of electrical power on a vehicle) to power components of the vehicle.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes a fuel separation system that may be mounted on-board a vehicle, such as a car, truck, boat, or other vehicle that utilizes an engine to generate motive power. In some aspects, the fuel separation system includes a fuel separator, such as a flash distillation unit, that is controllable to separate an input fuel stream into two or more fractional fuel streams based on a volatility difference of fractional components of the fuel. The separated fractional fuel components are each defined by a particular auto-ignition characteristic value, such as, for example, research octane number (RON), cetane number, or otherwise. The auto-ignition characteristic values of the separated fractional fuel components may vary, thus resulting in a fractional fuel component stream that has a lower value than another fractional fuel component stream from the fuel separator. In some aspects, an operating condition of the fuel separator, or one or more additional components of the on-board fuel separation system, is controlled based at least in part on an operating condition of the engine. In some aspects, the on-board fuel separation system includes a heat exchanger that is positioned to facilitate a transfer of heat from one or more fractional fuel component streams to a source fuel stream (for example, from a fuel tank of the vehicle).

Figure 1:
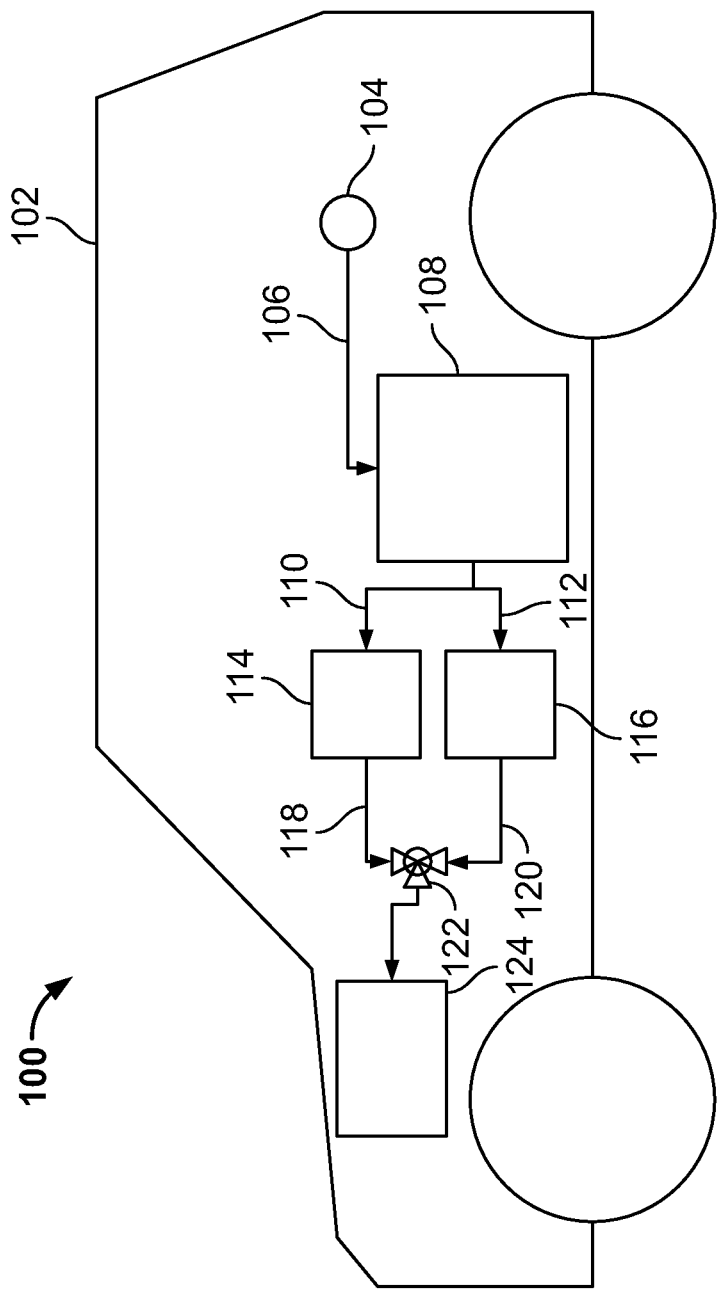
FIG. 1 is a schematic illustration of a multi-fuel vehicle system that includes an example implementation of an on-board fuel separation system according to the present disclosure.

FIG. 1 is a schematic illustration of a vehicle system 100 that includes an example implementation of an on-board fuel separation system 108 according to the present disclosure. As illustrated in FIG. 1, the vehicle system 100 includes a vehicle 100, which is represented as an automobile, but the present disclosure contemplates that a "vehicle" can include an automobile, motorized cycle, all-terrain vehicle (ATV), nautical vehicle (for example, boat or otherwise), or an airborne vehicle (for example, plane, ultralight, drone, or otherwise), whether manned or unmanned. Indeed, the present disclosure contemplates that a "vehicle" is any apparatus that derives powered movement from a hydrocarbon liquid fuel, such as gasoline, naphtha, or diesel as examples. A "vehicle" may also be any apparatus that includes an engine designed to use a fuel having an auto-ignition characteristic value, such as research octane number (RON) (or octane rating) (for example, in the case of gasoline fuels) or cetane number (for example, in the case of diesel fuels).

The illustrated vehicle 102 includes a fuel input 104 that is fluidly coupled to the on-board fuel separation system 108 to provide a fuel stream 106 to the separation system 108, for example, during operation of the vehicle 102. In some aspects, a fuel tank (not shown) is fluidly coupled in between the fuel input 104 and the on-board fuel separation system 108, for example, to contain a particular volume of fuel stream 106. In such aspects, the fuel stream 106 may be variably circulated (for example, pumped) from the fuel tank to the on-board fuel separation system 108, for example, as necessary for operation of the vehicle 102. In some aspects, a fuel rail of the vehicle could also be used for circulation of the fuel stream 106.

As described herein, the on-board fuel separation system 108 separates the fuel stream 106 into two or more individual fraction streams based on, for example, a particular characteristic of the fuel stream 106. For example, the fuel stream 106 may be separated into fractions based on a volatility difference of the fractions within the fuel stream 106. The fuel stream 106, in some aspects, may be separated into an aromatic or oxygenate fraction as well as other compound fractions. In some aspects, the on-board fuel separation system 108 may include one or more fuel separators, such as flash distillation separators (for example, flash tanks or compact distillation units or otherwise), that separate the fuel stream 106 based on the volatility difference of the fractions into separate fractions, each having distinct auto-ignition characteristic values (for example, RON, cetane number, or otherwise).

In some aspects, the on-board fuel separation system 108 may be controllably operated at multiple pressures, multiple temperature, or both, to optimize the auto-ignition characteristic value of the separated fractions (for example, RON, cetane number, or otherwise), a particular flow rate of the separated fractions, or both. Further controllable aspects of the on-board fuel separation system 108 include, for example, a temperature profile of a compact distillation unit within the on-board fuel separation system 108, a number of equilibrium stages within the on-board fuel separation system 108, feed location, and reflux ratio.

The illustrated vehicle 102 includes two or more fuel fraction conduits shown as 110 and 112, which fluidly couple the on-board fuel separation system 108 to fractional fuel tanks 114 and 116. For example, the fuel fraction conduit 110 may fluidly couple the on-board fuel separation system 108 to the fractional fuel tank 114 to store a fuel fraction output by the on-board fuel separation system 108 that has a particular auto-ignition characteristic value, while the fuel fraction conduit 112 may fluidly couple the on-board fuel separation system 108 to the fractional fuel tank 116 to store another fuel fraction output by the on-board fuel separation system 108 that has a different auto-ignition characteristic value. In particular implementations, the fractional fuel tank 114 may store a fuel fraction output by the on-board fuel separation system 108 that has a higher RON relative to a fuel fraction output by the on-board fuel separation system 108 that is stored in the fractional fuel tank 116. Although only two fractional fuel tanks are shown, the present disclosure contemplates that more than two fractional fuel tanks may be fluidly coupled to the on-board fuel separation system 108 (for example, depending on the number of separation stages of the on-board fuel separation system 108).

In some aspects, the two fuel streams 118 and 120 may each be fed directly to the engine 124. For example, one fuel stream (of fuel streams 118 and 120) could by port-injected and the other fuel stream (of fuel streams 118 and 120) could be directly injected into the cylinders of the engine 124. This implementation may avoid any time lag in providing the correct fuel to the engine 124, as a time lag could result from the fuel already in the fuel line after valve 122. In some aspects, the fuel route for the fuel streams 118 and 120 is kept as short as possible.

In this example schematic illustration, the fractional fuel tanks 114 and 116 are fluidly coupled to an engine 124 (for example, internal combustion gasoline, naphtha, or diesel engine) through fractional fuel supply lines 118 and 120 and a control valve 122. For example, the fractional fuel tank 114 (for example, which stores a higher RON fuel fraction) is fluidly coupled to the engine 124 through the supply line 118, while the fractional fuel tank 116 (for example, which stores a lower RON fuel fraction) is fluidly coupled to the engine 124 through the supply line 120. Based on, for example, dynamic (for example, instantaneous or real-time) driving conditions, such as speed vs. torque conditions, the control valve 122 may be controlled (for example, by a vehicle control system, not shown) to supply a particular fuel fraction stored in one of the fractional fuel tanks 114/116 to the engine 124. The supplied fuel fraction may have an auto-ignition characteristic value (for example, RON or cetane number) optimized for the dynamic (for example, instantaneous or real-time) driving conditions. For example, a higher RON fuel fraction (for example, stored in tank 114) may be circulated to the engine 124 based on high load engine conditions, high speed engine conditions, or a combination thereof. A lower RON fuel fraction (for example, stored in tank 116) may be circulated to the engine 124 based on low load engine conditions, low speed engine conditions, or a combination thereof.

In some aspects, the on-board fuel separation system 108 may help reduce fuel consumption, cost and $CO_2$ emissions. For example, depending on engine operating requirements (for example, dynamic or in real-time), a fuel fraction that has minimum required auto-ignition characteristic value (for example, RON) is supplied to the engine 124 (and not more as is conventional). Therefore, the on-board fuel separation system 108 may store a relatively high RON fuel fraction (for example, in fractional fuel tank 114) for the high load and high speed operating conditions. Similarly, a relatively low RON fuel fraction is stored (for example, in fractional fuel tank 116) for low load and low speed operating conditions.

In some aspects, the fractional fuel tanks 114 and 116 may be eliminated from the system 100, and, thus, one of the fuel fractions (for example, a higher RON fraction or lower RON fraction) may be circulated in real-time (for example, during operation of the engine 124 to power the vehicle 102) from the on-board fuel separation system 108 to the engine 124 as dictated by the engine operating conditions (for example, speed vs. torque, engine map operating point, or otherwise). Thus, in some aspects, the only fuel storage tank on the vehicle 102 may be fluidly coupled between the fuel input 104 and the on-board fuel separation system 108 (for example, a standard vehicle fuel tank). Therefore, in some aspects, the on-board fuel separation system 108 may be integrated into a conventional vehicle 102 that includes a single fuel tank.

Figure 2:
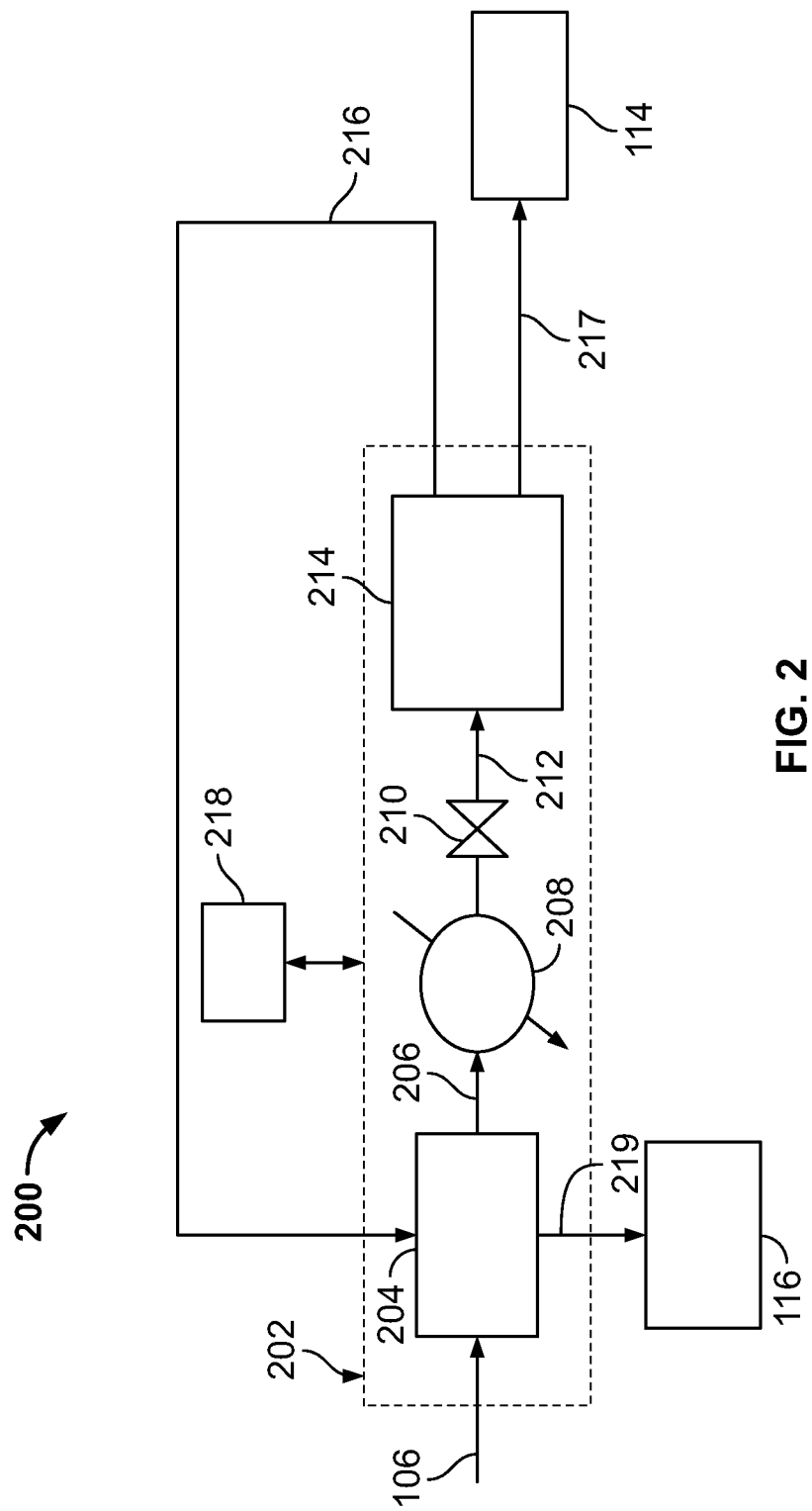
FIG. 2 is a schematic illustration of an example implementation of an on-board fuel separation system according to the present disclosure.

FIG. 2 is a schematic illustration of an example implementation of an on-board fuel separation system 200 according to the present disclosure. In some aspects, at least a portion of the system 200 may be implemented as the on-board fuel separation system 108 in the vehicle 102 shown in FIG. 1. The illustrated on-board fuel separation system 200 includes an on-board fuel separation sub-assembly 202 (designated by the dashed line) that includes several components. As illustrated, the fuel stream 106 may be received at a heat exchanger 204 (for example, a plate and frame heat exchanger, shell and tube heat exchanger, fin and tube heat exchanger, or otherwise). The heat exchanger 204 also receives an input of a vapor fuel stream 216 that is output from the on-board fuel separation sub-assembly 202 and circulated back to the heat exchanger 204.

The heat exchanger 204 outputs a heated fuel stream 206 to a secondary heater 208 (for example, hot coolant, hot exhaust gas, electric heater or otherwise). An orifice 210 (for example, valve, fixed orifice, variable orifice, or otherwise) is fluidly coupled between the heater 208 and a fuel separator 214. A fuel stream input 212 from the orifice 210 provides the heated fuel stream 206 (for example, at increased or decreased pressure) to the fuel separator 214.

In some aspects, the fuel separator 214 may be operated at a vacuum. For example, in some implementations in which a particular auto-ignition characteristic value is desired, the fuel separator 214 may be operated under a vacuum (for example, lower than ambient operating pressure) to recover increased high volatility components of the fuel stream input 212.

The fuel separator 214, in the illustrated implementation of system 200, separates the fuel stream input 212 into two fuel fraction streams: the vapor fuel stream 216 and a liquid fuel stream 217. In this example, the liquid fuel stream 217 may be supplied to the fractional fuel tank 114.

The illustrated fuel separator 214 may be a flash distillation assembly that separates the input fuel stream 212 into at least two separate fuel fractions (for example, vapor stream 216 and liquid stream 217) based on a relative volatility of the fractional components of the input fuel stream. In some aspects, the flash distillation assembly may include one or more flash tanks that are fitted with screens or similar internal structures to prevent or reduce liquid droplets (mist) from being carried with the vapor stream 216. In some aspects, the flash distillation assembly may be a compact distillation unit filled with structured or random packing, or with trays, to improve the separation and prevent or reduce mist carryover into the vapor stream 216. Further, in some aspects, a number of flash tanks in the flash distillation assembly may be determined by, for example, components of the fuel stream 106 (for example, linear alkanes, branched alkanes, cyclic alkanes, alkenes, aromatics) and their relative volatility, the volatility of additives of the fuel stream 106 such as oxygenates, desired auto-ignition characteristic value of the vapor stream 216 and the liquid stream 217, relative flow rates of the vapor stream 216 and the liquid stream 217, or a combination thereof. Although two output streams (for example, the vapor stream 216 and the liquid stream 217) are shown from the fuel separator 214, more than two output streams (for example, based on a number of fuel separation stages, flash tanks, or otherwise).

The illustrated system 200 also includes a control system 218 that is communicably coupled to the on-board fuel separation sub-assembly 202 (for example, communicably coupled to control one or more of the components, as well as unillustrated components, of the on-board fuel separation sub-assembly 202). In some aspects, the control system 218 may be a mechanical, pneumatic, electro-mechanical, or micro-processor based control system (or a combination thereof). The control system 218 may receive (or store) inputs associated with engine operating characteristics of an engine of a vehicle that includes the on-board fuel separation system 200 and, based on the received (or stored) inputs, send control signals to, for example, one or more valves that adjust or control the temperature, the flow rates of the fuel stream 106, the heated fuel stream 206, the vapor stream 216, the liquid stream 217, or a combination thereof. The control system 218 may also be communicably coupled to the fuel separator 214 to control, for example, operating temperature, pressure, or pressures, of the flash tank(s) in the fuel separator 214. The control system 218 may also be communicably coupled to the secondary heater 208 to, for example, further add heat to the heated fuel stream 206 prior to the fuel separator 214.

Example engine operating characteristics include, for example, engine load, torque and speed and fuel specifications such as vapor-liquid ratio, a vapor lock index, a drivability index, a T90 or T95 property, a fuel lubricity, a fuel viscosity, or an engine speed-torque ratio, among other examples. Such characteristics (as inputs to the control system 218) may be used, at least in part, to adjust one or more operating characteristics of the on-board fuel separation system 202. For example, operating pressure, temperature, or both of the heat exchanger 204, the fuel separator 214, or both, may be adjusted. Flow rates, pressures, temperature, or a combination thereof, of one or more of the illustrated fuel streams (for example, the fuel stream 106, the heated fuel stream(s), the vapor fuel stream 216, the liquid fuel stream 217, or otherwise) may also be adjusted (for example, by controlling valves, not shown, with the control system 218). By adjusting one or more components of the on-board fuel separation system 202 with the control system 218, the auto-ignition characteristic values of one or both of the vapor fuel stream 216 and the liquid fuel stream 217 may be adjusted, for example, to desired values according to engine operating conditions.

In some implementations, at high load, gasoline engines require high octane (for example, long ignition delay) fuel to avoid knocking and engine damage. The octane of the liquid stream 217 may be high octane, and the flow rate may be determined by a temperature of the fuel separator 214 (for example, at constant pressure) as shown graphically in FIGS. 5A-5C, 6A-6C. In some aspects, the on-board controller 218 may have an estimate of the amount of the high RON fuel (and associated RON value) based on a factory setting, driving history, or both. The controller 218 may have predictive functions that give the RON and flow values at each temperature of the fuel separator 214, and the fuel specifications (for example, vapor lock index, T95, and other specifications). The controller 218 may then set the fuel separator 214 temperature to an optimum value to maximize the amount of the high RON fuel (liquid stream 217) by allowing more or less heat in the heater 208, as needed. For other applications, the temperature could be chosen to maximize the RON value at a fixed high RON stream. Another function of the controller 218 may be to keep a minimum level of liquid in the fuel separator 214 to avoid some vapor going to the liquid tank 114. This could be accomplished by having a control valve in the conduit for the liquid stream 217.

For compact distillation implementation, the octane numbers and the flow rates of the vapor stream 216 and liquid stream 217 may be determined by more than one variable: the temperatures of a reboiler and a condenser (for example, for the vapor stream 216) and a number of equilibrium stages, reflux ratio and an amount of condensate drawn from the condenser (at a fixed pressure). This control strategy may be similar to that described above, but with more variables to control, and there is no liquid holdup in the fuel separator 214.

In some aspects, the separation system 200 may be unlikely to follow the fast dynamics of the engine in real-time. Thus, in some implementation, a vehicle with the on-board fuel separation system 200 may include two smaller tanks, 114 and 116, (in addition to a main fuel tank) for the two separated fuel streams 216 and 217.

The illustrated vapor stream 216 and liquid stream 217 may have different auto-ignition characteristic values. For example, in some aspects, the vapor stream 216 may have an auto-ignition characteristic value that is less than an auto-ignition characteristic value of the liquid stream 217. In some aspects, the auto-ignition characteristic values of the vapor stream 216 and the liquid stream 217 may be RON or cetane number.

In an example operation, the fuel stream 106 is circulated (for example, forcibly pumped, sprayed, or otherwise) to the heat exchanger 204, as well as the vapor stream 216 output from the fuel separator 214. Heat from the vapor stream 216 is transferred, in the heat exchanger 204, to the fuel stream 106 and output from the heat exchanger 204 as the heated fuel stream 206. The vapor stream 216, which has a particular auto-ignition characteristic value (for example, a low RON relative to the RON of the liquid stream 217), condenses in the heat exchanger 204 as heat is transferred to the fuel stream 106. The condensed vapor stream 219 (now as a liquid stream with the low RON) may be circulated to the fractional fuel tank 116 and stored for use as a fuel source for an engine (for example, engine 124).

In some aspects, prior to circulation of the fuel stream 106 to the heat exchanger 204, the fuel stream 106 may be preheated, for example, with electric heating, heating tape, or otherwise. For example, in "cold start" situations (for example, where the engine of the vehicle is being started), the fuel stream 106 may be preheated based on an inability of the vapor stream 216, or the heating stream through heater 208, to provide sufficient heat, in the cold start situation, to the fuel stream 106. In such aspects, one or more of the fuel fractions (for example, the low RON, condensed vapor phase 219 or the high RON liquid phase 217) stored in the fractional fuel tanks 116 and 114 may be used as the cold start fuel for the engine.

In some aspects, the vapor stream 216 may not completely condense to a liquid in the heat exchanger 204. In such aspects, the partially condensed vapor stream 219 may be further cooled to more completely condense any remaining vapor in the stream 219. For example, the vapor in the partially condensed vapor stream 219 may be separated and circulated to the engine with an air intake to the engine. As another example, a secondary heat exchanger (not shown) such as a cooling coil, radiator, or otherwise, may further cool the vapor stream 219 (for example, with a cold refrigerant that is part of the vehicle air-conditioning system) between the heat exchanger 204 and the fractional fuel tank 116. As yet another example, a pressure of the partially condensed vapor stream 219 may be increased to further or fully condense the stream 219 prior to the fractional fuel tank 116.

The heated fuel stream 206 is circulated through the secondary heater 208, which may add additional heat to the heated fuel stream 206. For example, the secondary heater 208 may be controlled (for example, by the control system 218) to add additional heat so that particular auto-ignition characteristic values (for example, RON or cetane number) may be met in the vapor stream 216 and the liquid stream 217.

The heated fuel stream 206 (further heated by the secondary heater 208 or otherwise) is circulated through the orifice 210 and into the fuel separator 214 as the fuel stream input 212. In some aspects, the orifice 210 may be controlled (for example, by the control system 218) to adjust a pressure of the fuel input stream 212 so that particular auto-ignition characteristic values (for example, RON or cetane number) may be met in the vapor stream 216 and the liquid stream 217.

The fuel input stream 212 is circulated through the fuel separator 214 and separated (for example, based on relative volatilities of the fractions of the fuel input stream 212) into the illustrated vapor stream 216 and the illustrated liquid stream 217. In some aspects, the fuel separator 214 may separate the fuel input stream 212 into multiple vapor streams and multiple liquid streams, each with a particular auto-ignition characteristic value (for example, RON or cetane number). In such aspects, the fuel separator 214 (for example, flash tanks or distillation units or combination thereof) may have multiple separation stages.

The liquid stream 217 output from the fuel separator 214, in this example, has an auto-ignition characteristic value (for example, RON) that is higher than the auto-ignition characteristic value of the vapor stream 216. The liquid stream 217 is circulated to the fractional fuel tank 114 and stored for use as a fuel source for an engine (for example, engine 124).

Figure 3:
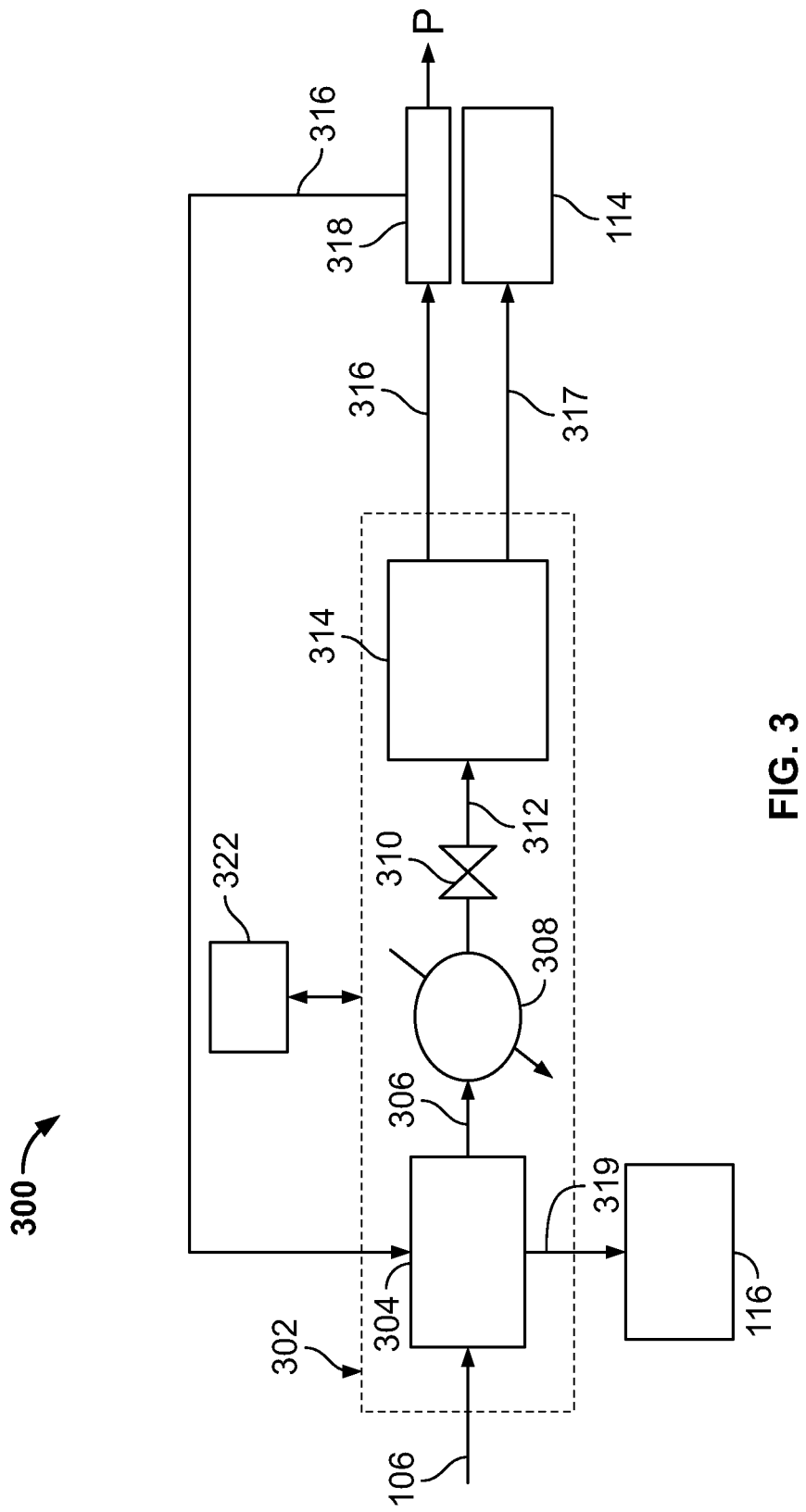
FIG. 3 is a schematic illustration of another example implementation of an on-board fuel separation system according to the present disclosure.

FIG. 3 is a schematic illustration of another example implementation of an on-board fuel separation system 300 according to the present disclosure. In some aspects, at least a portion of the system 300 may be implemented as the on-board fuel separation system 108 in the vehicle 102 shown in FIG. 1. System 300 may be similar to system 200, shown in FIG. 2, but also includes a power generator 318 that is fluidly coupled between a fuel separator 314 and a heat exchanger 304 within the on-board fuel separation sub-assembly 302. The power generator 318 may generate power (for example, electrical power), P, within a vehicle (for example, vehicle 102) that includes the on-board fuel separation system 300.

The illustrated on-board fuel separation system 300 includes an on-board fuel separation sub-assembly 302 (designated by the dashed line) that includes several components. As illustrated, the fuel stream 106 may be received at a heat exchanger 304 (for example, a plate and frame heat exchanger, shell and tube heat exchanger, fin and tube heat exchanger, or otherwise). The heat exchanger 304 also receives an input of a vapor fuel stream 316 that is output from the on-board fuel separation sub-assembly 302 and circulated back to the heat exchanger 304.

The heat exchanger 304 outputs a heated fuel stream 306 to a secondary heater 308 (for example, hot coolant, hot exhaust gas, electric heater or otherwise). An orifice 310 (for example, valve, fixed orifice, variable orifice, or otherwise) is fluidly coupled between the heater 308 and a fuel separator 314. A fuel stream input 312 from the orifice 310 provides the heated fuel stream 306 (for example, at increased or decreased pressure) to the fuel separator 314.

The fuel separator 314, in the illustrated implementation of system 300, separates the fuel stream input 312 into two fuel fraction streams: the vapor fuel stream 316 and a liquid fuel stream 317. In this example, the liquid fuel stream 317 may be supplied to the fractional fuel tank 114.

In some aspects, the fuel separator 314 may be operated at a vacuum. For example, in some implementations in which a particular auto-ignition characteristic value is desired, the fuel separator 314 may be operated under a vacuum (for example, lower than ambient operating pressure) to recover increased high volatility components of the fuel stream input 312. In still further aspects, for example in implementations that include the power generator 318, the fuel separator 314 may be operated at higher pressures (for example, pressures above ambient pressure) by regulating a pressure, a temperature, or both, of the separator 314 (for example, with a back pressure regulator downstream of the separator 314). In such aspects, the pressurized vapor stream 316 may drive the power generator 318. Power from the power generator 318 may be used, for example, as turbocharging, supercharging, electricity, or a combination thereof.

The illustrated fuel separator 314 may be a flash distillation assembly that separates the input fuel stream 312 into at least two separate fuel fractions (for example, vapor stream 316 and liquid stream 317) based on a relative volatility of the fractional components of the input fuel stream. In some aspects, the flash distillation assembly may include one or more flash tanks that are fitted with screens or similar internal structures to prevent or reduce liquid droplets (mist) from being carried with the vapor stream 316. In some aspects, the flash distillation assembly may be a compact distillation unit filled with structured or random packing, or with trays, to improve the separation and prevent or reduce mist carryover into the vapor stream 316. Further, in some aspects, a number of flash tanks in the flash distillation assembly may be determined by, for example, components of the fuel stream 106 (for example, linear alkanes, branched alkanes, cyclic alkanes, alkenes, aromatics) and their relative volatility, the volatility of additives of the fuel stream 106 such as oxygenates, desired auto-ignition characteristic value of the vapor stream 316 and the liquid stream 317, relative flow rates of the vapor stream 316 and the liquid stream 317, or a combination thereof. Although two output streams (for example, the vapor stream 316 and the liquid stream 317) are shown from the fuel separator 314, more than two output streams (for example, based on a number of fuel separation stages, flash tanks, or otherwise).

The power generator 318 is fluidly coupled within the vapor stream 316 between the fuel separator 314 and the heat exchanger 304. The power generator 318, in some aspects, may be a turbine or micro-turbine mounted in the vehicle that receives the vapor stream 316 at a particular pressure, which turns the turbine to generate power, P, and outputs the vapor stream 316 at a reduced pressure to the heat exchanger 304. The auto-ignition characteristic value (for example, RON or cetane number) of the vapor stream 316 may remain unchanged or substantially unchanged as the vapor stream 316 rotates the power generator and loses pressure.

The illustrated system 300 also includes a control system 322 that is communicably coupled to the on-board fuel separation sub-assembly 302 (for example, communicably coupled to control one or more of the components, as well as unillustrated components, of the on-board fuel separation sub-assembly 302). In some aspects, the control system 322 may be a mechanical, pneumatic, electro-mechanical, or micro-processor based control system (or a combination thereof). The control system 322 may receive (or store) inputs associated with engine operating characteristics of an engine of a vehicle that includes the on-board fuel separation system 300 and, based on the received (or stored) inputs, send control signals to, for example, one or more valves that adjust or control the flow rates of the fuel stream 106, the heated fuel stream 306, the vapor stream 316, the liquid stream 317, or a combination thereof. The control system 322 may also be communicably coupled to the fuel separator 314 to control, for example, operating temperature, pressure, or pressures, of the flash tank(s) in the fuel separator 314. The control system 322 may also be communicably coupled to the secondary heater 308 to, for example, further add heat to the heated fuel stream 306 prior to the fuel separator 314.

Example engine operating characteristics include, for example, engine load, torque and speed and fuel specifications such as vapor-liquid ratio, a vapor lock index, a drivability index, a T90 or T95 property, a fuel lubricity, a fuel viscosity, or an engine speed-torque ratio, among other examples. Such characteristics (as inputs to the control system 322) may be used, at least in part, to adjust one or more operating characteristics of the on-board fuel separation system 302. For example, operating pressure, temperature, or both of the heat exchanger 304, the fuel separator 324, or both, may be adjusted. Flow rates, pressures, temperature, or a combination thereof, of one or more of the illustrated fuel streams (for example, the fuel stream 106, the heated fuel stream(s), the vapor fuel stream 316, the liquid fuel stream 317, or otherwise) may also be adjusted (for example, by controlling valves, not shown, with the control system 322). By adjusting one or more components of the on-board fuel separation system 302 with the control system 318, the auto-ignition characteristic values of one or both of the vapor fuel stream 316 and the liquid fuel stream 317 may be adjusted, for example, to desired values according to engine operating conditions.

The illustrated vapor stream 316 and liquid stream 317 may have different auto-ignition characteristic values. For example, in some aspects, the vapor stream 316 may have an auto-ignition characteristic value that is less than an auto-ignition characteristic value of the liquid stream 317. In some aspects, the auto-ignition characteristic values of the vapor stream 316 and the liquid stream 317 may be RON or cetane number.

In an example operation, the fuel stream 106 is circulated (for example, forcibly pumped, sprayed, or otherwise) to the heat exchanger 304, as well as the vapor stream 316 output from the fuel separator 314. Heat from the vapor stream 316 is transferred, in the heat exchanger 304, to the fuel stream 106 and output from the heat exchanger 304 as the heated fuel stream 306. The vapor stream 316, which has a particular auto-ignition characteristic value (for example, a low RON relative to the RON of the liquid stream 317), condenses in the heat exchanger 304 as heat is transferred to the fuel stream 106. The condensed vapor stream 319 (now as a liquid stream with the low RON) may be circulated to the fractional fuel tank 116 and stored for use as a fuel source for an engine (for example, engine 134).

In some aspects, prior to circulation of the fuel stream 106 to the heat exchanger 304, the fuel stream 106 may be preheated, for example, with electric heating, heating tape, or otherwise. For example, in "cold start" situations (for example, where the engine of the vehicle is being started), the fuel stream 106 may be preheated based on an inability of the vapor stream 316 to provide sufficient heat, in the cold start situation, to the fuel stream 106. In such aspects, one or more of the fuel fractions (for example, the low RON, condensed vapor phase 319 or the high RON liquid phase 317) stored in the fractional fuel tanks 116 and 114 may be used as the cold start fuel for the engine.

In some aspects, the vapor stream 316 may not completely condense to a liquid in the heat exchanger 304. In such aspects, the partially condensed vapor stream 319 may be further cooled to more completely condense any remaining vapor in the stream 319. For example, the vapor in the partially condensed vapor stream 319 may be separated and circulated to the engine with an air intake to the engine. As another example, a secondary heat exchanger (not shown) such as a cooling coil, radiator, or otherwise, may further cool the vapor stream 319 (for example, with a cold refrigerant that is part of the vehicle air-conditioning system) between the heat exchanger 304 and the fractional fuel tank 116. As yet another example, a pressure of the partially condensed vapor stream 319 may be increased to further or fully condense the stream 319 prior to the fractional fuel tank 116.

The heated fuel stream 306 is circulated through the secondary heater 308, which may or may not add additional heat to the heated fuel stream 306. For example, the secondary heater 308 may be controlled (for example, by the control system 322) to add additional heat so that particular auto-ignition characteristic values (for example, RON or cetane number) may be met in the vapor stream 316 and the liquid stream 317.

The heated fuel stream 306 (further heated by the secondary heater 308 or otherwise) is circulated through the orifice 310 and into the fuel separator 314 as the fuel stream input 312. In some aspects, the orifice 310 may be controlled (for example, by the control system 322) to adjust a pressure of the fuel input stream 312 so that particular auto-ignition characteristic values (for example, RON or cetane number) may be met in the vapor stream 316 and the liquid stream 317.

The fuel input stream 312 is circulated through the fuel separator 314 and separated (for example, based on relative volatilities of the fractions of the fuel input stream 312) into the illustrated vapor stream 316 and the illustrated liquid stream 317. In some aspects, the fuel separator 314 may separate the fuel input stream 312 into multiple vapor streams and multiple liquid streams, each with a particular auto-ignition characteristic value (for example, RON or cetane number). In such aspects, the fuel separator 314 (for example, flash tanks or distillation units or combination thereof) may have multiple separation stages.

In the illustrated implementation, the vapor phase 316 is circulated to the power generator 318 (for example, a turbine or micro-turbine). The vapor phase 316 drives the power generator 318 to generate power, P, and is output from the power generator 318 at a lower pressure (but still in vapor phase) than that at which the phase 316 entered the generator 318. The lower pressure vapor phase 316 is circulated from the power generator 318 to the heat exchanger 304.

The liquid stream 317 output from the fuel separator 314, in this example, has an auto-ignition characteristic value (for example, RON) that is higher than the auto-ignition characteristic value of the vapor stream 316. The liquid stream 317 is circulated to the fractional fuel tank 114 and stored for use as a fuel source for an engine (for example, engine 124).

Figure 4:
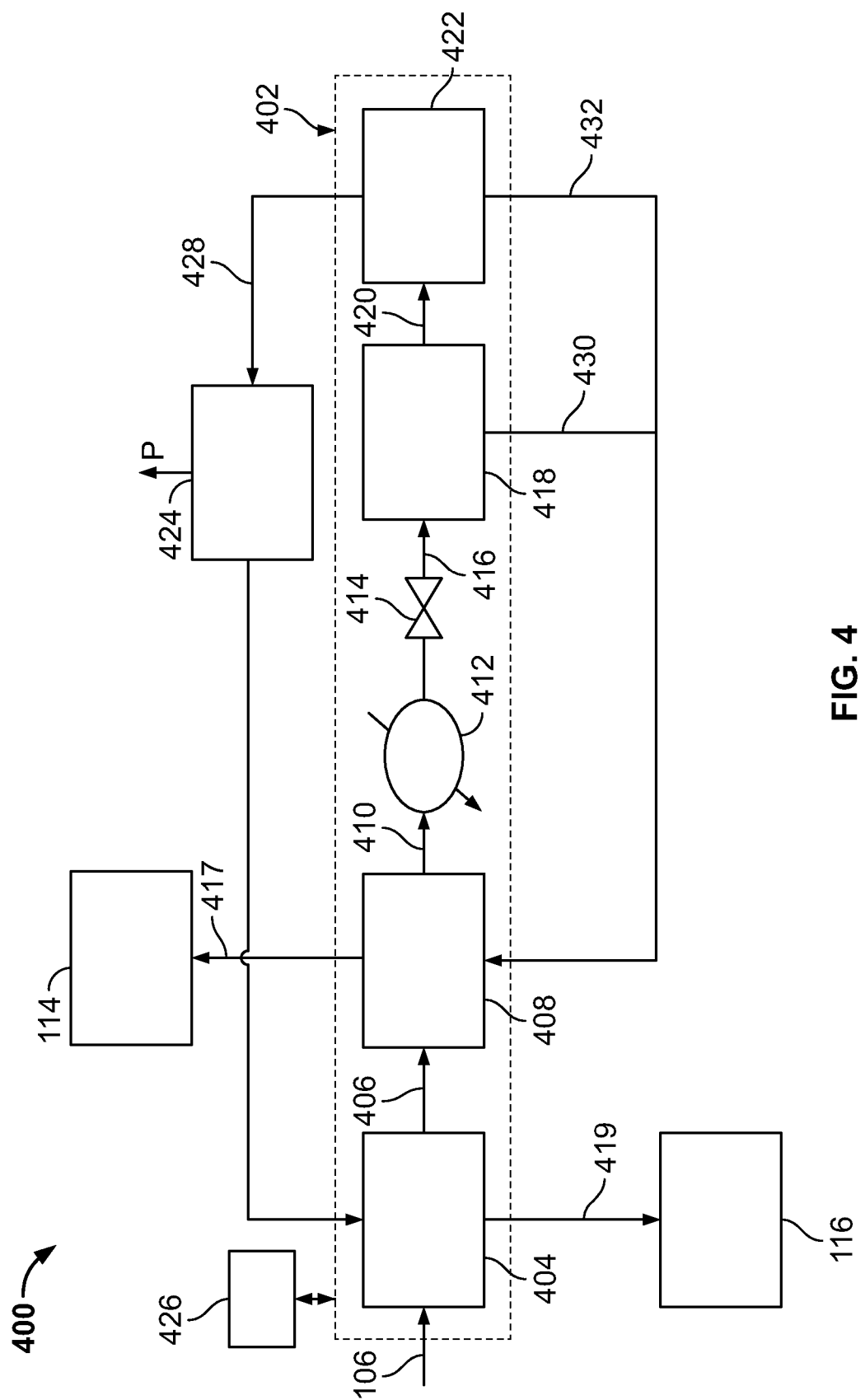
FIG. 4 is a schematic illustration of another example implementation of an on-board fuel separation system according to the present disclosure.

FIG. 4 is a schematic illustration of another example implementation of an on-board fuel separation system 400 according to the present disclosure. In some aspects, at least a portion of the system 400 may be implemented as the on-board fuel separation system 108 in the vehicle 102 shown in FIG. 1. System 400 may be similar to systems 200 and 300, shown in FIGS. 2 and 3, but also includes a power generator 424, a two stage heat exchanger system, and a two stage fuel separator system. Thus, the system 400 may further separate the vapor stream, obtained from the first flash tank, to high RON oxygenates and low RON compounds.

The illustrated on-board fuel separation system 400 includes an on-board fuel separation sub-assembly 402 (designated by the dashed line) that includes several components. As illustrated, the fuel stream 106 may be received at a first-stage heat exchanger 404 (for example, a plate and frame heat exchanger, shell and tube heat exchanger, fin and tube heat exchanger, or otherwise). The first-stage heat exchanger 404 also receives an input of a vapor fuel stream 428 (for example, a low RON compounds vapor stream) that is output from the on-board fuel separation sub-assembly 402 and circulated back to the first-stage heat exchanger 404.

The first-stage heat exchanger 404 outputs a heated fuel stream 406 to a second-stage heat exchanger 408 (for example, a plate and frame heat exchanger, shell and tube heat exchanger, fin and tube heat exchanger, or otherwise). The second-stage heat exchanger 408 receives the heated fuel stream 406 and a combined liquid fuel stream that includes a high RON liquid stream 430 output from a first stage fuel separator 418 and a high RON oxygenate fuel stream 432 from a second-stage fuel separator 422. In this example implementation, these two fuel streams combine and are circulated to the second-stage heat exchanger 408 to provide further heat to the heated fuel stream 406 prior to fuel separation. From the second-stage heat exchanger 408, a combined high RON fuel stream 417 is circulated to the fractional fuel tank 114 (for example, a high RON fuel tank). In alternative implementations, one or both of the high RON liquid stream 430 and the high RON oxygenate fuel stream 432 may be supplied to the fractional fuel tank 114 without passing through the second-stage heat exchanger 408.

In another example implementation, the order of the first- and second-stage heat exchangers may be reversed. For example, a first-stage heat exchanger 404 may receive the fuel stream 106 and a combined liquid fuel stream that includes a high RON liquid stream 430 output from a first stage fuel separator 418 and a high RON oxygenate fuel stream 432 from a second-stage fuel separator 422. The first-stage heat exchanger 404 outputs the heated fuel stream 406 to the second-stage heat exchanger 408, which receives an input of a vapor fuel stream 428 (for example, a low RON compounds vapor stream) that is output from the on-board fuel separation sub-assembly 402.

The further heated fuel stream 410 is fluidly coupled to a secondary heater 412 (for example, hot coolant, hot exhaust gas, electric heater or otherwise) that can controllably provide additional heat to the fuel stream 410. An orifice 414 (for example, valve, fixed orifice, variable orifice, or otherwise) is fluidly coupled between the heater 412 and a first-stage fuel separator 418. A fuel stream input 416 from the orifice 414 provides the further heated fuel stream 410 (for example, at increased or decreased pressure) to the first-stage fuel separator 418.

The first-stage fuel separator 414, in the illustrated implementation of system 400, separates the fuel stream input 416 into two fuel fraction streams: a low RON vapor fuel stream 420 and a high RON liquid fuel stream 430 based on, for example, a volatility of the fuel stream input 416. In this example, the high RON liquid fuel stream 430 may be supplied to the fractional fuel tank 114 as described previously.

As illustrated in this implementation, the separated low RON vapor fuel stream 420 is fluidly coupled to a second-stage fuel separator 422. In this example, the second-stage fuel separator 422 may separate (for example, based on volatility of the vapor stream 420) the vapor stream 420 into a low RON compound stream 428 and a high RON oxygenate stream 432. As described previously, the high RON oxygenate stream 432 may combine with the high RON liquid stream (for example, through the second-stage heat exchanger 408 or the fractional fuel tank 114).

The illustrated fuel separators 418 and 422 may be flash distillation assemblies that separate the input fuel streams (for example, fuel stream 412 and vapor stream 420) into at least two separate fuel fractions based on a relative volatility of the fractional components of the input fuel stream. In some aspects, each flash distillation assembly may include one or more flash tanks that are fitted with screens or similar internal structures to prevent or reduce liquid droplets (mist) from being carried with a vapor stream within the fuel separator. In some aspects, each flash distillation assembly may be a compact distillation unit filled with structured or random packing, or with trays, to improve the separation and prevent or reduce mist carryover into a vapor stream. Further, in some aspects, a number of flash tanks in each flash distillation assembly may be determined by, for example, components of the fuel stream 106 (for example, linear alkanes, branched alkanes, cyclic alkanes, alkenes, aromatics) and their relative volatility, the volatility of additives of the fuel stream 106 such as oxygenates, desired auto-ignition characteristic value of a resultant low RON stream or high RON stream, relative flow rates of the resultant low RON stream or high RON stream, or a combination thereof.

In some aspects, one or both of the first-stage fuel separator 418 and second-stage fuel separator 422 may be operated at a vacuum. For example, in some implementations in which a particular auto-ignition characteristic value is desired, the first-stage fuel separator 414, the second-stage fuel separator 422, or both, may be operated under a vacuum (for example, lower than ambient operating pressure) to recover increased high volatility components of the fuel stream input 416 or low RON vapor stream 420.

A power generator 424, in this example implementation, is fluidly coupled within the low RON compounds (vapor) stream 428 between the second-stage fuel separator 422 and the first-stage heat exchanger 404. The power generator 424, in some aspects, may be a turbine or micro-turbine mounted in the vehicle that receives the low RON compounds (vapor) stream 428 at a particular pressure, which turns the turbine to generate power, P, and outputs the low RON compounds (vapor) stream 428 at a reduced pressure to the first-stage heat exchanger 404. The auto-ignition characteristic value (for example, RON or cetane number) of the low RON compounds (vapor) stream 428 may remain unchanged or substantially unchanged as the low RON compounds (vapor) stream 428 rotates the power generator 424 and loses pressure.

The illustrated system 400 also includes a control system 426 that is communicably coupled to the on-board fuel separation sub-assembly 402 (for example, communicably coupled to control one or more of the components, as well as unillustrated components, of the on-board fuel separation sub-assembly 402). In some aspects, the control system 426 may be a mechanical, pneumatic, electro-mechanical, or micro-processor based control system (or a combination thereof). The control system 426 may receive (or store) inputs associated with engine operating characteristics of an engine of a vehicle that includes the on-board fuel separation system 400 and, based on the received (or stored) inputs, send control signals to, for example, one or more valves that adjust or control the flow rates of the fuel stream 106, the heated fuel streams 406, 410, and/or 416, the low RON vapor stream 420, the high RON liquid stream 430, the low RON compounds stream 428, the high RON oxygenate stream 432, or a combination thereof. The control system 426 may also be communicably coupled to the first-stage fuel separator 418, the second-stage fuel separator 422, or both, to control, for example, operating pressure, or pressures, of the flash tank(s) in the fuel separators 418 and 422. The control system 426 may also be communicably coupled to the secondary heater 412 to, for example, further add heat to the heated fuel stream 410 prior to the first-stage fuel separator 418.

Example engine operating characteristics include, for example, engine load, torque and speed and fuel specifications such as vapor-liquid ratio, a vapor lock index, a drivability index, a T90 or T95 property, a fuel lubricity, a fuel viscosity, or an engine speed-torque ratio, among other examples. Such characteristics (as inputs to the control system 426) may be used, at least in part, to adjust one or more operating characteristics of the on-board fuel separation system 402. For example, operating pressure, temperature, or both of the first or second stage heat exchangers 404/408, the first or second stage fuel separators 418/422, or combinations thereof, may be adjusted. Flow rates, pressures, temperature, or a combination thereof, of one or more of the illustrated fuel streams (for example, the fuel stream 106, the heated fuel stream(s), the low RON vapor fuel stream 420, the high RON liquid fuel stream 430, the low RON compounds vapor stream 428, the high RON oxygenates stream 432, or otherwise) may also be adjusted (for example, by controlling valves, not shown, with the control system 426). By adjusting one or more components of the on-board fuel separation system 402 with the control system 426, the auto-ignition characteristic values of one or both of the vapor fuel stream 420 and the liquid fuel stream 430 may be adjusted, for example, to desired values according to engine operating conditions.

In an example operation, the fuel stream 106 and the low RON compounds vapor stream 428 are circulated (for example, forcibly pumped, sprayed, or otherwise) to the first-stage heat exchanger 404. Heat from the vapor stream 428 is transferred, in the first-stage heat exchanger 404, to the fuel stream 106 and output from the first-stage heat exchanger 404 as the heated fuel stream 406. The vapor stream 428, which has a particular auto-ignition characteristic value (for example, a low RON relative to the RON of the liquid stream 430), condenses in the first-stage heat exchanger 404 as heat is transferred to the fuel stream 106. The condensed vapor stream 419 (now as a liquid stream with the low RON) may be circulated to the fractional fuel tank 116 and stored for use as a fuel source for an engine (for example, engine 124).

In some aspects, prior to circulation of the fuel stream 106 to the first-stage heat exchanger 404, the fuel stream 106 may be preheated, for example, with electric heating, heating tape, or otherwise. For example, in "cold start" situations (for example, where the engine of the vehicle is being started), the fuel stream 106 may be preheated based on an inability of the vapor stream 418 to provide sufficient heat, in the cold start situation, to the fuel stream 106. In such aspects, one or more of the fuel fractions (for example, the low RON, condensed vapor phase 419 or the combined high RON liquid phase 417) stored in the fractional fuel tanks 116 and 114 may be used as the cold start fuel for the engine.

In some aspects, the low RON compounds vapor stream 428 may not completely condense to a liquid in the first-stage heat exchanger 404. In such aspects, the partially condensed vapor stream 419 may be further cooled to more completely condense any remaining vapor in the stream 419. For example, the vapor in the partially condensed vapor stream 419 may be separated and circulated to the engine with an air intake to the engine. As another example, a secondary heat exchanger (not shown) such as a cooling coil, radiator, or otherwise, may further cool the vapor stream 419 (for example, with a cold refrigerant that is part of the vehicle air-conditioning system) between the first-stage heat exchanger 404 and the fractional fuel tank 116. As yet another example, a pressure of the partially condensed vapor stream 419 may be increased to further or fully condense the stream 419 prior to the fractional fuel tank 116.

The heated fuel stream 406 is circulated through the second-stage heat exchanger 408, which also receives the combined high RON liquid stream 430 and high RON oxygenate stream 432 (in this example). Heat is transferred, in the second-stage heat exchanger 408, from the combined high RON streams to the heated fuel stream 406.

The further heated fuel stream 410 is circulated from the second-stage heat exchanger 408 to the secondary heater 412, which may or may not add additional heat to the heated fuel stream 410. For example, the secondary heater 412 may be controlled (for example, by the control system 426) to add additional heat so that particular auto-ignition characteristic values (for example, RON or cetane number) may be met in the vapor stream 420 and the liquid stream 430.

The further heated fuel stream 410 (further heated by the secondary heater 412 or otherwise) is circulated through the orifice 414 and into the first-stage fuel separator 418 as the fuel stream input 416. In some aspects, the orifice 414 may be controlled (for example, by the control system 426) to adjust a pressure of the fuel input stream 412 so that particular auto-ignition characteristic values (for example, RON or cetane number) may be met in the vapor stream 416 and the liquid stream 417.

The fuel input stream 416 is circulated through the first-stage fuel separator 418 and separated (for example, based on relative volatilities of the fractions of the fuel input stream 416) into the illustrated low RON vapor stream 420 and the illustrated high RON liquid stream 430. The liquid stream 430 output from the first-stage fuel separator 418, in this example, has an auto-ignition characteristic value (for example, RON) that is higher than the auto-ignition characteristic value of the vapor stream 420. The liquid stream 430 is circulated through the second-stage heat exchanger 408 (along with high RON oxygenate stream 432) to the fractional fuel tank 114 and stored for use as a fuel source for an engine (for example, engine 124).

The illustrated low RON vapor stream 420 is circulated from the first-stage fuel separator 418 to the second-stage fuel separator 422. In the second-stage fuel separator 422, the low RON vapor stream 420 is separated (for example, based on relative volatilities of the fractions of the vapor stream 420) into the low RON compounds vapor stream 428 and the high RON oxygenate stream 432. The low RON compounds vapor stream 428 is then circulated to the power generator 424 to drive the generator and produce power. Subsequently, the low RON compounds vapor stream 428 is circulated (at a lower pressure) to the first-stage heat exchanger 404, where it is condensed to the condensed low RON fuel stream 419 for storage in the fractional fuel tank 416 as a fuel source for an engine (for example, engine 124).

Figure 5A:
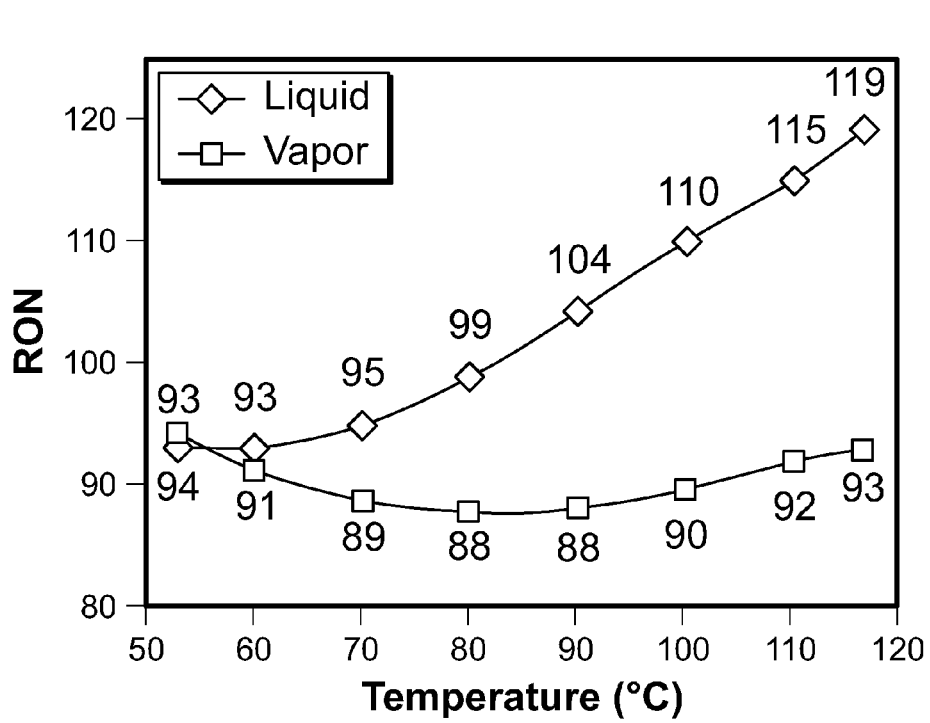
FIGS. 5A-5C are graphs that illustrate results of a simulation model of an on-board fuel separation system according to the present disclosure.
Figure 5B:
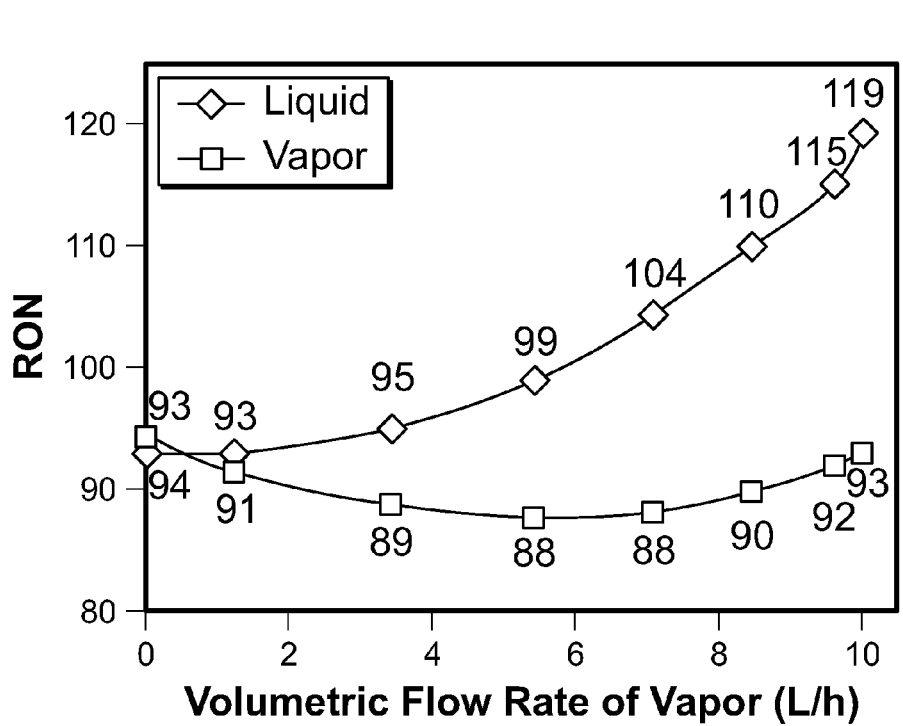
Figure 5C:
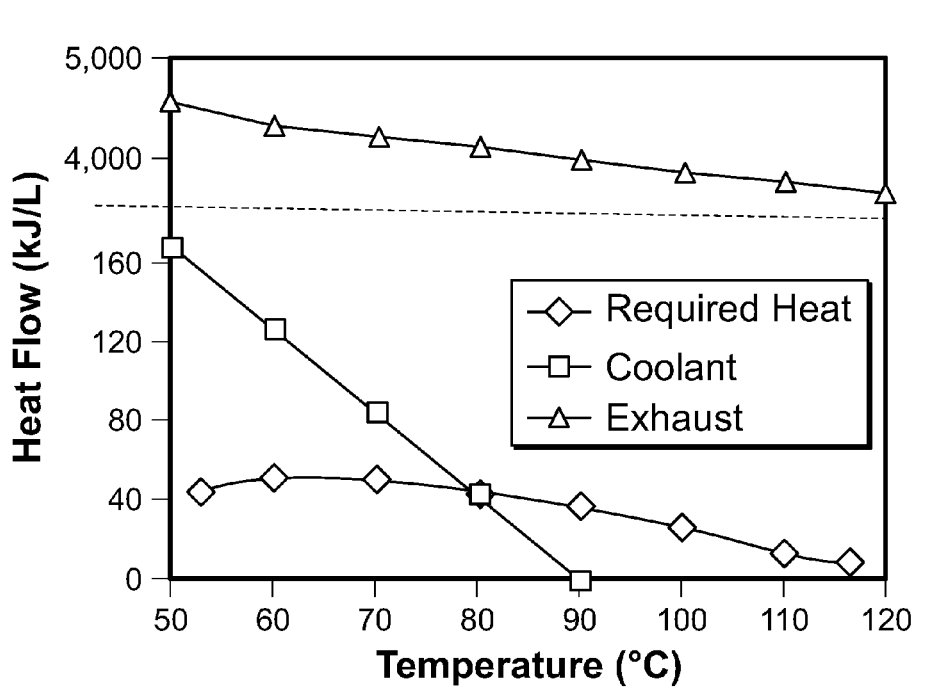

FIGS. 5A-5C are graphs 500, 505, and 510, respectively, that illustrate results of a simulation model of an on-board fuel separation system according to the present disclosure. The simulation model which results are shown in graphs 500, 505, and 510 simulates an operation of an on-board fuel separation system for a vehicle that includes a heat exchanger and single stage fuel separator, for example, as shown in system 200 in FIG. 2. In the simulation model of FIGS. 5A-5C, a fuel stream (for example, fuel stream 106) is 91 gasoline mixed with methyl tertiary butyl ether (MTBE).

Graph 500 illustrates RON of a liquid fuel stream (for example, liquid stream 217) and RON of a vapor fuel stream (for example, vapor fuel stream 216) relative to an operating temperature of a fuel separator (for example, fuel separator 214). In this example, the fuel separator of the simulation model is a single flash tank distillation unit. As illustrated, a relative difference in RON between the liquid fuel stream and the vapor fuel stream generally increases as flash distillation increases (up to 26 in RON difference).

Graph 505 illustrates RON of the liquid fuel stream and RON of the vapor fuel stream relative to an operating volumetric flow rate of the condensed vapor fuel stream (for example, fuel stream 219) of the fuel separator. As illustrated, a relative difference in RON between the liquid fuel stream and the vapor fuel stream generally increases as volumetric flow rate of the condensed vapor fuel stream from the flash distillation unit increases (up to 26 in RON difference).

Graph 510 illustrates heat flow rate relative to operating temperature of the fuel separator. In graph 510, the "Required Heat" line represents the required thermal energy per liter of incoming fuel in line 106 to achieve the RON differential at the specified temperature (for example, heat supplied to the fuel stream through heat exchanger(s), heaters, or both). The "Coolant" line represents the available thermal energy per liter of incoming fuel in the hot coolant that could be used in heat exchanger 208. In some aspects, beyond about 80° C., this heat is not usable (in heat exchanger 208) as the temperature difference may be zero or negative. The "Exhaust" line represents the available thermal energy per liter of incoming fuel in the exhaust gas that could be used in heat exchanger 208.

Figure 6A:
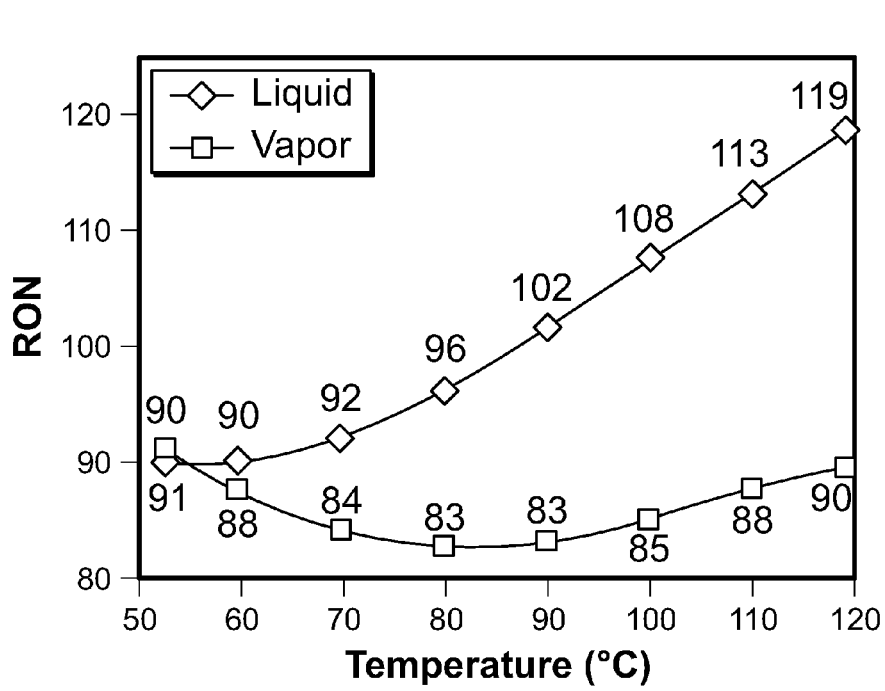
FIGS. 6A-6C are graphs that illustrate results of another simulation model of an on-board fuel separation system according to the present disclosure.
Figure 6B:
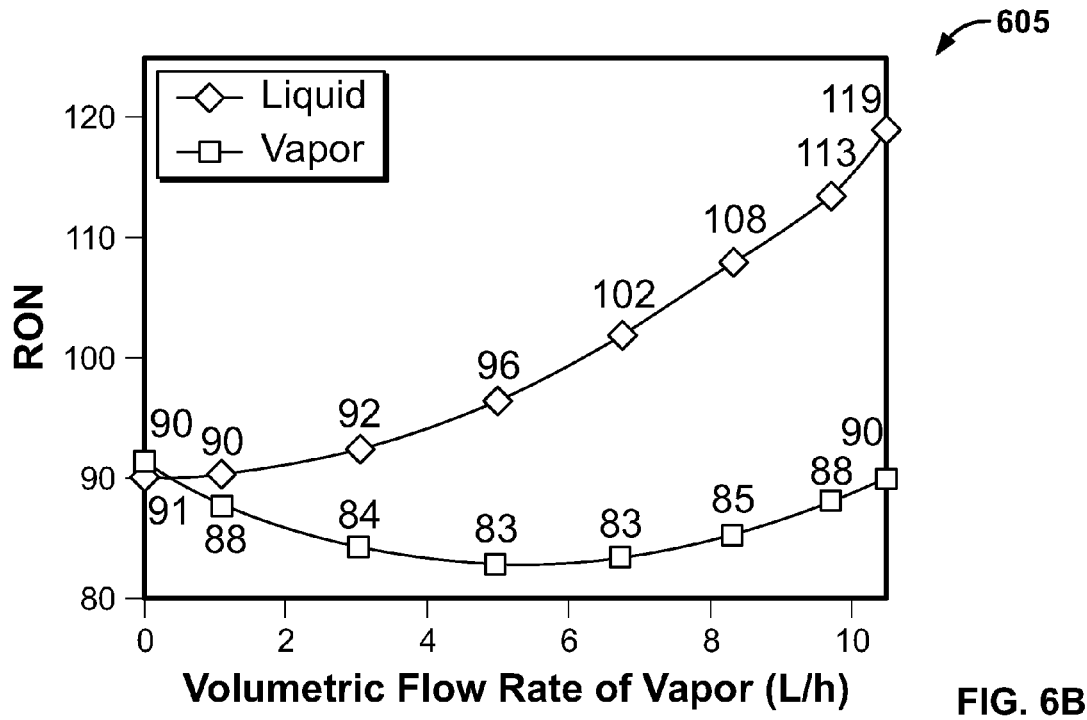
Figure 6C:
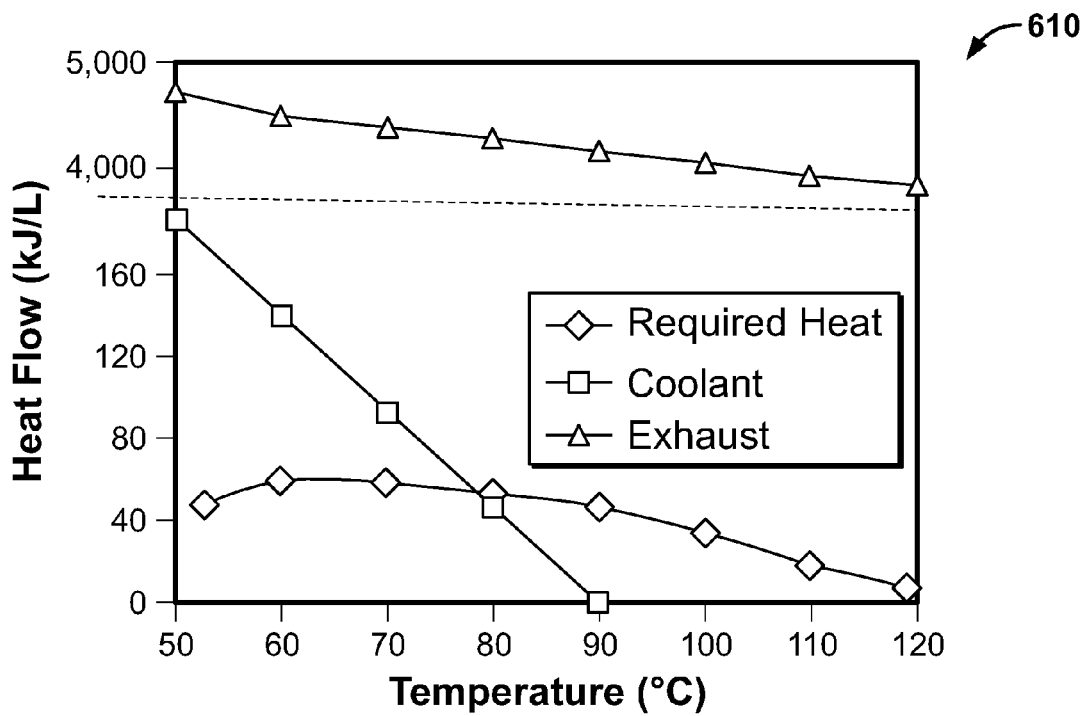

FIGS. 6A-6C are graphs 600, 605, and 610, respectively, that illustrate results of another simulation model of an on-board fuel separation system according to the present disclosure. The simulation model which results are shown in graphs 600, 605, and 610 simulates an operation of an on-board fuel separation system for a vehicle that includes a heat exchanger and single stage fuel separator, for example, as shown in system 200 in FIG. 2. In the simulation model of FIGS. 6A-6C, a fuel stream (for example, fuel stream 106) is 91 gasoline without oxygenates.

Graph 600 illustrates RON of a liquid fuel stream (for example, liquid stream 217) and RON of a vapor fuel stream (for example, vapor fuel stream 216) relative to an operating temperature of a fuel separator (for example, fuel separator 214). In this example, the fuel separator of the simulation model is a single tank flash distillation unit. As illustrated, a relative difference in RON between the liquid fuel stream and the vapor fuel stream generally increases as flash distillation increases (up to 29 in RON difference).

Graph 605 illustrates RON of the liquid fuel stream and RON of the vapor fuel stream relative to an operating volumetric flow rate of the vapor fuel stream (for example, fuel stream 219) of the fuel separator. As illustrated, a relative difference in RON between the liquid fuel stream and the vapor fuel stream generally increases as volumetric flow rate of the condensed vapor fuel stream from the flash distillation unit increases (up to 29 in RON difference).

Graph 610 illustrates heat flow rate relative to operating temperature of the fuel separator. In graph 610, the "Required Heat" line represents the required thermal energy per liter of incoming fuel in line 106 to achieve the RON differential at the specified temperature (for example, heat supplied to the fuel stream through heat exchanger(s), heaters, or both). The "Coolant" line represents the available thermal energy per liter of incoming fuel in the hot coolant that could be used in heat exchanger 208. In some aspects, beyond about 80° C., this heat is not usable (in heat exchanger 208) as the temperature difference may be zero or negative. The "Exhaust" line represents the available thermal energy per liter of incoming fuel in the exhaust gas that could be used in heat exchanger 208.

Figure 7A:
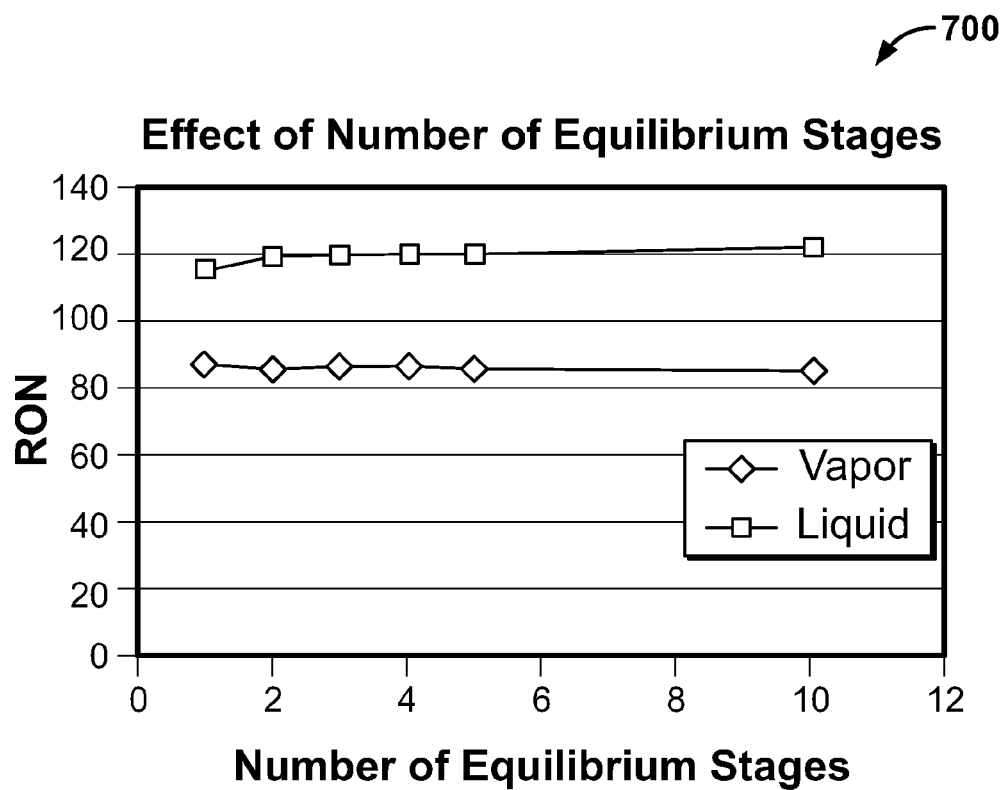
FIGS. 7A-7B are graphs that illustrate results of another simulation model of an on-board fuel separation system according to the present disclosure
Figure 7B:
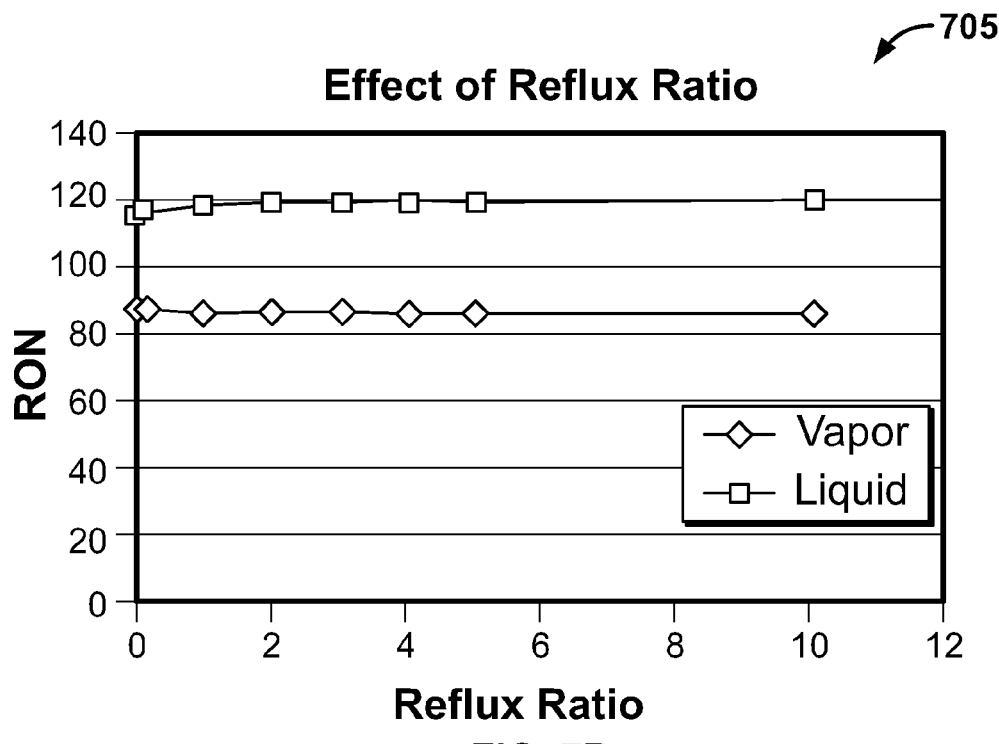

FIGS. 7A and 7B are graphs 700 and 705, respectively, that illustrate results of another simulation model of an on-board fuel separation system according to the present disclosure. Graph 700 shows an effect of a number of equilibrium stages in a fuel separator (for example, a compact distillation unit or a fuel separator with multiple flash tanks) on an auto-ignition characteristic value; here, RON. Graph 705 shows an effect of a reflux ratio on an auto-ignition characteristic value; here, RON. In some aspects, in a compact distillation unit, the number of equilibrium stages and the reflux ratio are additional design variables, which can be varied to vary RON of the output streams (for example, vapor and liquid streams).

Figure 8:
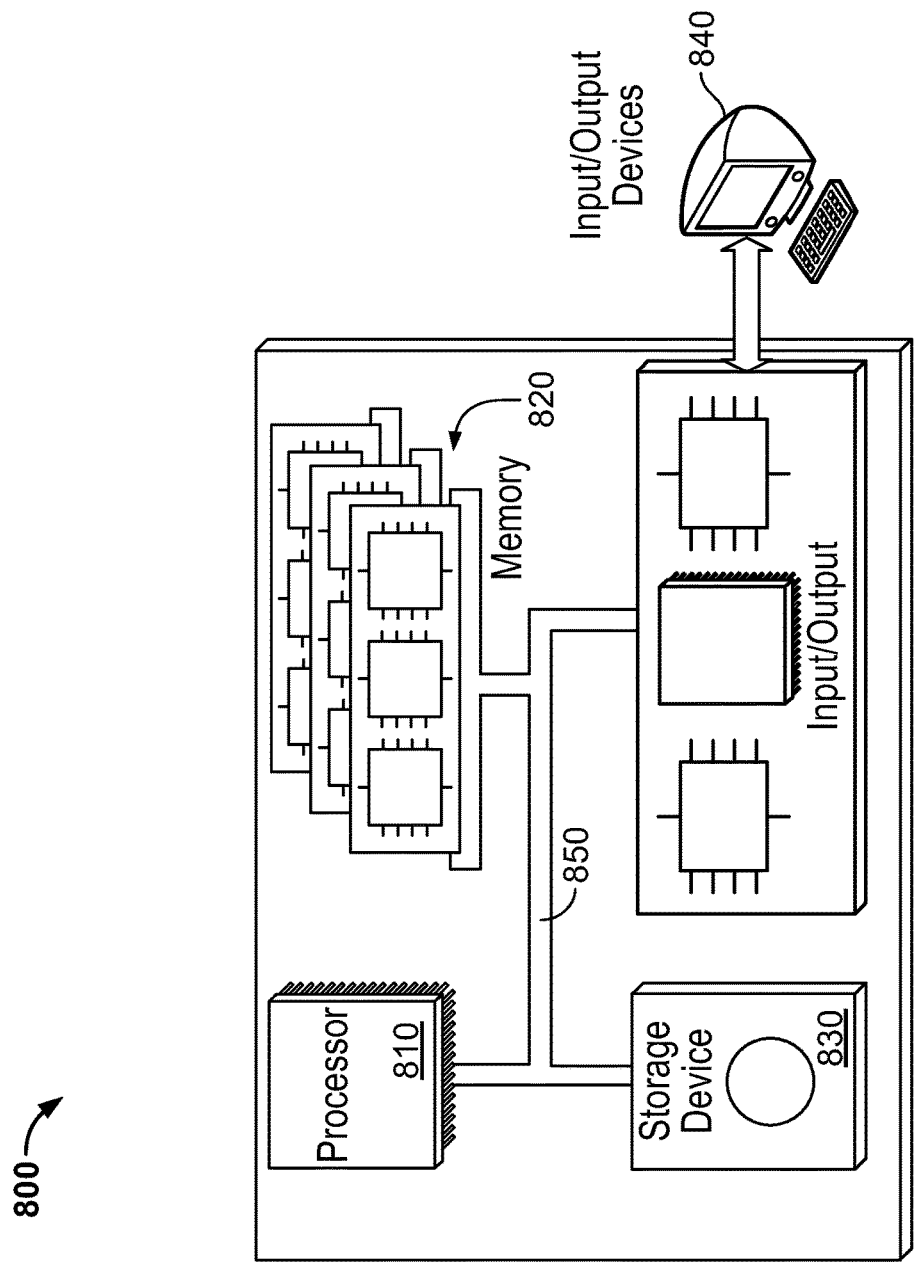
FIG. 8 is a schematic illustration of an example controller for an on-board fuel separation system according to the present disclosure.

FIG. 8 is a schematic illustration of an example controller 800 (or control system) for an on-board fuel separation system. For example, the controller 800 can be used for the operations described previously, for example as or as part of the control systems 218, 322, 426 or other controllers described herein. For example, the controller 800 may be communicably coupled with, or as a part of, one or both of a vehicle engine and on-board fuel separation system as described herein.

The controller 800 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 800 includes a processor 810, a memory 820, a storage device 830, and an input/output device 840. Each of the components 810, 820, 830, and 840 are interconnected using a system bus 850. The processor 810 is capable of processing instructions for execution within the controller 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the controller 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the controller 800. In one implementation, the storage device 830 is a computer-readable medium. In various different implementations, the storage device 830 may be a floppy disk device, a hard disk device, an optical disk device, or a tape device.

The input/output device 840 provides input/output operations for the controller 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A fuel separation system, comprising:
    a fuel separator that comprises a first stage fuel separator and a second stage fuel separator and is configured to receive a fuel stream and separate the fuel stream, based on a volatility of the fuel stream, into a vapor stream defined by a first auto-ignition characteristic value and a first liquid stream defined by a second auto-ignition characteristic value, the second auto-ignition characteristic value greater than the first auto-ignition characteristic value, the first stage fuel separator configured to receive the fuel stream and separate the fuel stream, based on the volatility of the fuel stream, into the vapor stream defined by the first auto-ignition characteristic value and the first liquid stream defined by the second auto-ignition characteristic value, the second stage fuel separator configured to separate the vapor stream into an oxygenate stream and a compound stream; and
    a control system communicably coupled to the fuel separator and operable to receive an input from an engine, the input comprising an engine operating condition, the control system configured to adjust an operating parameter of the fuel separator, based at least in part on the engine operating condition, to vary at least one of the first or second auto-ignition characteristic values.

2. The fuel separation system of claim 1, wherein the engine operating condition comprises an engine load, an engine torque, and engine speed, a fuel vapor-liquid ratio, a fuel vapor lock index, a fuel drivability index, a fuel T90 or T95 property, a fuel lubricity, a fuel viscosity, or an engine speed-torque ratio.

3. The fuel separation system of claim 1, further comprising a heat exchanger fluidly coupled between a fuel input of the fuel stream and the fuel separator, the heat exchanger configured to transfer heat from the vapor stream to the fuel stream, and output a heated fuel stream to the fuel separator and a second liquid stream defined by the first auto-ignition characteristic value.

4. The fuel separation system of claim 3, wherein the heat exchanger is configured to condense the vapor stream to the second liquid stream defined by the first auto-ignition characteristic value.

5. The fuel separation system of claim 3, further comprising a heater coupled between the heat exchanger and the fuel separator and configured to receive the heated fuel stream and further heat the heated fuel stream.

6. The fuel separation system of claim 5, further comprising a variable orifice fluidly coupled between the heat exchanger and the fuel separator.

7. The fuel separation system of claim 6, wherein the control system is operatively coupled to control at least one of the heat exchanger, the heater, or the variable orifice to vary at least one of a temperature or a flow rate of at least one of the heated fuel stream, the vapor stream, the first liquid stream, or the second liquid stream.

8. The fuel separation system of claim 1, wherein the fuel separator comprises a flash distillation separator.

9. The fuel separation system of claim 1, wherein the second stage fuel separator is configured to direct the oxygenate stream to combine with the first liquid stream, and to direct the compound stream to the heat exchanger.

10. The fuel separation system of claim 1, wherein the first auto-ignition characteristic value comprises a first research octane number (RON) or a first cetane number, and the second auto-ignition characteristic value comprises a second RON or a second cetane number.

11. A method for separating a fuel on-board a vehicle, comprising:
    receiving, at a control system of an on-board fuel separation system of a vehicle that comprises an engine, an engine operating condition;
    operating a fuel separator that comprises a first stage fuel separator and a second stage fuel separator of the on-board fuel separator at an operating parameter to separate a fuel stream into a vapor stream and a first liquid stream based on a volatility of the fuel stream, the vapor stream defined by a first auto-ignition characteristic value and the first liquid stream defined by a second auto-ignition characteristic value, the second auto-ignition characteristic value greater than the first auto-ignition characteristic value, wherein operating the fuel separator comprises:
        separating, with the first stage fuel separator, the heated fuel stream into the vapor stream defined by the first auto-ignition characteristic value and the first liquid stream defined by the second auto-ignition characteristic value, based on the volatility of the fuel stream, and
        separating, with the second stage fuel separator, the vapor stream into an oxygenate stream and a compound stream;
    adjusting, based at least in part on the engine operating condition, the operating parameter of the fuel separator to vary at least one of the first or second auto-ignition characteristic values; and
    operating the fuel separator of the on-board fuel separator at the adjusted operating parameter.

12. The method of claim 11, wherein the engine operating condition comprises an engine load, an engine torque, and engine speed, a fuel vapor-liquid ratio, a fuel vapor lock index, a fuel drivability index, a fuel T90 or T95 property, a fuel lubricity, a fuel viscosity, or an engine speed-torque ratio.

13. The method of claim 11, further comprising:
    supplying an unheated fuel stream and the vapor stream from the fuel separator to a heat exchanger;
    transferring heat from the vapor stream to the unheated fuel stream to heat the unheated fuel stream;
    supplying the heated fuel stream to the fuel separator; and supplying a second liquid stream defined by the first auto-ignition characteristic value from the heat exchanger.

14. The method of claim 13, further comprising condensing, with the heat exchanger, the vapor stream to form the second liquid stream.

15. The method of claim 13, further comprising:
further heating the heated fuel stream; and
supplying the further heated fuel stream to the fuel separator.

16. The method of claim 15, further comprising circulating the heated fuel stream through a variable orifice fluidly coupled between the heat exchanger and the fuel separator.

17. The method of claim 16, further comprising controlling, with the control system, at least one of the heat exchanger, the heater, or the variable orifice to vary at least one of a temperature or a flow rate of at least one of the heated fuel stream, the vapor stream, the first liquid stream, or the second liquid stream.

18. The method of claim 11, further comprising:
combining the oxygenate stream with the first liquid stream; and
supplying the compound stream to the heat exchanger.

19. The method of claim 11, wherein the first auto-ignition characteristic value comprises a first research octane number (RON) or a first cetane number, and the second auto-ignition characteristic value comprises a second RON or a second cetane number.

20. A vehicle system, comprising
a vehicle;
a fuel-powered internal combustion engine mounted in the vehicle;
an on-board fuel separation system, comprising:
a fuel separator that comprises a first stage fuel separator and a second stage fuel separator and is configured to receive a fuel stream and separate the fuel stream, based on a volatility of the fuel stream, into a vapor stream defined by a first auto-ignition characteristic value and a first liquid stream defined by a second auto-ignition characteristic value, the second auto-ignition characteristic value greater than the first auto-ignition characteristic value, the first stage fuel separator configured to receive the fuel stream and separate the fuel stream, based on the volatility of the fuel stream, into the vapor stream defined by the first auto-ignition characteristic value and the first liquid stream defined by the second auto-ignition characteristic value, the second stage fuel separator configured to separate the vapor stream into an oxygenate stream and a compound stream; and
a control system communicably coupled to the fuel separator and operable to receive an input from the engine, the input comprising an engine operating condition, the control system configured to adjust an operating parameter of the fuel separator, based at least in part on the engine operating condition, to vary at least one of the first or second auto-ignition characteristic values;
a first fuel tank fluidly coupled between the engine and the fuel separator to store the first liquid stream output from the fuel separator; and
a second fuel tank fluidly coupled between the engine and the heat exchanger to store the second liquid stream output from the heat exchanger.

21. The vehicle system of claim 20, wherein the engine operating condition comprises an engine load, an engine torque, and engine speed, a fuel vapor-liquid ratio, a fuel vapor lock index, a fuel drivability index, a fuel T90 or T95 property, a fuel lubricity, a fuel viscosity, or an engine speed-torque ratio.

22. The vehicle system of claim 20, further comprising a heat exchanger fluidly coupled between a fuel input of the fuel stream and the fuel separator, the heat exchanger configured to transfer heat from the vapor stream to the fuel stream, and output a heated fuel stream to the fuel separator and a second liquid stream defined by the first auto-ignition characteristic value.

23. The vehicle system of claim 22, wherein the heat exchanger is configured to condense the vapor stream to the second liquid stream defined by the first auto-ignition characteristic value.

24. The vehicle system of claim 22, further comprising:
a heater coupled between the heat exchanger and the fuel separator and configured to receive the heated fuel stream and further heat the heated fuel stream; and
a variable orifice fluidly coupled between the heat exchanger and the fuel separator.

25. The vehicle system of claim 24, wherein the control system is operatively coupled to control at least one of the heat exchanger, the heater, or the variable orifice to vary at least one of a temperature or a flow rate of at least one of the heated fuel stream, the vapor stream, the first liquid stream, or the second liquid stream.

26. The vehicle system of claim 20, wherein the first auto-ignition characteristic value comprises a first research octane number (RON) or a first cetane number, and the second auto-ignition characteristic value comprises a second RON or a second cetane number.

27. The vehicle system of claim 20, further comprising a turbine that comprises an input fluidly coupled to the fuel separator and output fluidly coupled to the heat exchanger and configured to receive the vapor stream from the fuel separator and generate electrical power based on a pressure difference of the vapor stream between the input and the output.

28. The fuel separation system of claim 3, wherein the operating parameter of the fuel separator comprises at least one of an operating pressure, an operating temperature, a flow rate of the fuel stream, a flow rate of the vapor stream, a flow rate of the first liquid stream, or a flow rate of the second liquid stream.

29. The method of claim 13, wherein the operating parameter of the fuel separator comprises at least one of an operating pressure, an operating temperature, a flow rate of the fuel stream, a flow rate of the vapor stream, a flow rate of the first liquid stream, or a flow rate of the second liquid stream.

30. The vehicle system of claim 22, wherein the operating parameter of the fuel separator comprises at least one of an operating pressure, an operating temperature, a flow rate of the fuel stream, a flow rate of the vapor stream, a flow rate of the first liquid stream, or a flow rate of the second liquid stream.

* * * * *